United States Patent
Gengler et al.

(10) Patent No.: US 11,104,297 B2
(45) Date of Patent: Aug. 31, 2021

(54) SYSTEMS AND METHODS FOR MULTI-KEYHOLDER DIGITAL LOCKOUT

(71) Applicant: NOKE, INC., Lehi, UT (US)

(72) Inventors: David P. Gengler, Draper, UT (US); Sean Louis Calkins, Midvale, UT (US); Kenneth Richard Goldthorpe, Eagle Mountain, UT (US); Kyle Blackburn Johnson, Spanish Fork, UT (US)

(73) Assignee: NOKE, INC., Lehi, UT (US)

( * ) Notice: Subject to any disclaimer, the term of this patent is extended or adjusted under 35 U.S.C. 154(b) by 0 days.

(21) Appl. No.: 16/858,324

(22) Filed: Apr. 24, 2020

(65) Prior Publication Data
US 2020/0339064 A1 Oct. 29, 2020

Related U.S. Application Data

(60) Provisional application No. 62/839,394, filed on Apr. 26, 2019.

(51) Int. Cl.
*B60R 25/01* (2013.01)
*G07C 9/00* (2020.01)
*B60R 25/24* (2013.01)

(52) U.S. Cl.
CPC .............. *B60R 25/01* (2013.01); *B60R 25/24* (2013.01); *G07C 9/00571* (2013.01)

(58) Field of Classification Search
CPC ...... B60R 25/01; B60R 25/24; G07C 9/00571
See application file for complete search history.

(56) References Cited

U.S. PATENT DOCUMENTS

| | | | |
|---|---|---|---|
| 10,121,301 B1* | 11/2018 | Ren | G07C 9/00571 |
| 2016/0260271 A1* | 9/2016 | Belhadia | G06F 21/35 |
| 2016/0343181 A1* | 11/2016 | Cheng | G07C 9/00309 |
| 2016/0368455 A1* | 12/2016 | Kim | B60R 25/25 |
| 2017/0053467 A1* | 2/2017 | Meganck | G07C 9/00563 |
| 2018/0330559 A1* | 11/2018 | Saeedi | G07C 9/257 |

FOREIGN PATENT DOCUMENTS

| | | |
|---|---|---|
| EP | 3188082 B1 | 12/2019 |
| KR | 1020120137740 A | 12/2012 |
| KR | 101376279 A | 3/2014 |

OTHER PUBLICATIONS

Search Report for International Application No. PCT/US2020/029923; dated Aug. 14, 2020.

* cited by examiner

*Primary Examiner* — Thomas D Alunkal
(74) *Attorney, Agent, or Firm* — Barnes & Thornburg LLP; Jason A. Bernstein

(57) ABSTRACT

This disclosure provides systems and methods for lockout-tagout procedures and systems supporting the same, including, without limitation, lockout devices that can store and maintain digital locks simultaneously by multiple keyholders. In various embodiments, a single user can add multiple keyholders to a digital lock. The user may not be able to remove anyone as a keyholder except herself. Thus, the digital lock may remain in a locked state until each of the added keyholders applies their digital key, password, pin, and/or other personal identifying information to unlock the digital by removing themselves as a keyholder.

20 Claims, 17 Drawing Sheets

3300

| Machines | |
|---|---|
| Drill Press | 🔓 🔒 |
| Lathe | 🔓 🔒 |
| Molding Machine | 🔓 🔒 |
| Harvester | 🔓 🔒 |

SYSTEMS AND METHODS FOR MULTI-KEYHOLDER DIGITAL LOCKOUT

PRIORITY CLAIM

This patent application claims priority to U.S. Provisional Patent Application No. 62/839,394, filed Apr. 26, 2019, the disclosure of which is incorporated herein by reference in its entirety.

TECHNICAL FIELD

This disclosure generally relates to electronic locking systems. More specifically, this disclosure relates to systems and methods for electronic lockout systems that are part of a lockout-tagout (LOTO) procedure.

BRIEF DESCRIPTION OF THE DRAWINGS

Non-limiting and non-exhaustive embodiments of the disclosure are described herein, including various embodiments of the disclosure with reference to the figures listed below.

FIG. 21 illustrates a portion of an example interface of a software program for actuating, controlling, and configuring wireless-enabled digital locks that engage and disengage machines and machine locations.

DETAILED DESCRIPTION

Figure 1:
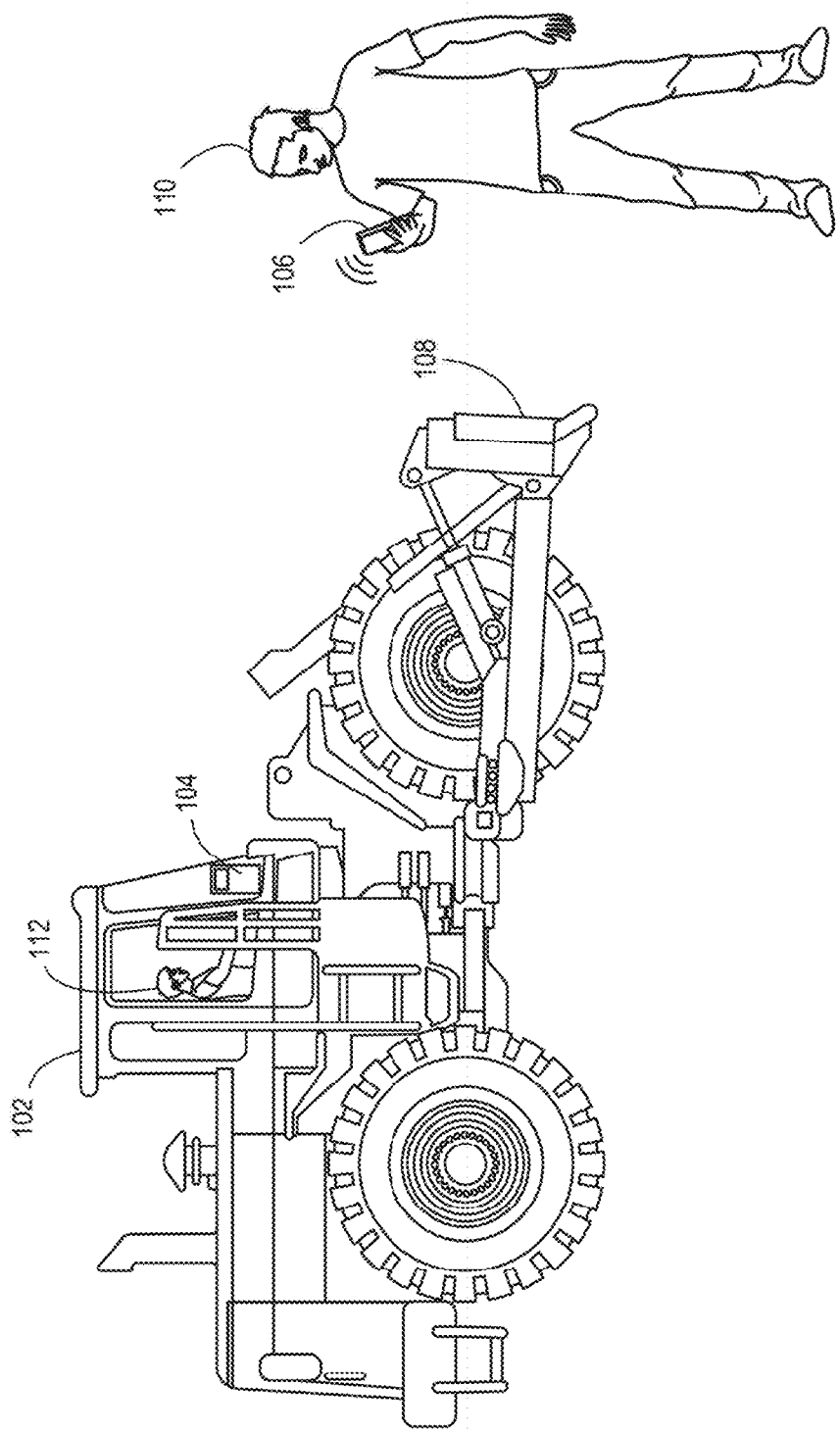
FIG. 1 illustrates a user locking out a portion of a wirelessly-connected machine, according to one embodiment.

A wide variety of general access controls such as physical locks, electronic locks, software-controlled locks, and the like have been developed for various machines, vehicles, and vehicle components and attachments. Examples of technologies that require locking include, without limitation, ignition switches, blades, machine arms and other types of computer-controlled equipment. Moreover, various adaptations of basic technologies and combinations thereof may be utilized. The systems and methods disclosed herein may be adapted for use with any wireless-enabled lock/unlock or enable/disable device.

Many of the embodiments described herein allow for a machine or other device to be unlocked or enabled via a wireless signal and/or a pattern-based authentication. The wireless-enabled locking and unlocking may, for example, be Bluetooth enabled such that proximity of an authorized user to the device associated with the digital locks allows the digital lock to be unlocked and/or results in the digital lock automatically unlocking. The presently described systems and methods allow for wireless operation using an existing portable electronic device that is Bluetooth enabled (e.g., a mobile phone, tablet, laptop, watch, wearable tech, smart glasses, etc.).

This disclosure describes various systems and methods of multi-user locking and unlocking. This disclosure relates to the use of Bluetooth, Wi-Fi, or other network-enabled locks. In this application, "Bluetooth" or "network-enabled" locking generally refer to all network-enabled general access controls. The disclosure generally relates, to lockout-tagout procedures, such as may be used for personal safety devices associated with machinery, tractors, heavy equipment (front loaders), harvesters, etc. Such devices may be physically locked out in some embodiments (e.g., via a padlock) or electronically locked out (e.g., via software enabling/disabling of computer-controlled components).

Lockout-tagout procedures are implemented to protect operators and repair technicians (e.g., authorized users) of machinery that is hazardous. For instance, lockout procedures prevent operators from operating an unsafe machine or from initiating the machine while it is being repaired. Following proper lockout procedures reduces the risk of catastrophic incidents. A poorly or under-maintained machine can kill an operator or repair technician.

A specific example of a lockout-tagout procedure may be described as a sequence of steps including (1) Proper identification of the equipment and locations of incident; (2) Notification to affected employees and personnel; (3) Proper shut down of the affected systems at each machine location; (4) Disconnection of all primary energy sources; (5) Address, disconnect, or lock all secondary sources of energy; (6) Verify the lockout of all energy sources of the machine; (7) Ensure continuity between shifts and other changes until the repair is finalized; and/or (8) All affected parties have to provide their credentials to authorized bringing the equipment back online. In some embodiments, the system may omit some steps, require additional steps, and/or implement steps in an alternative order or more than once. The systems and methods described herein may be customized and adapted for a particular industry, workplace, legal jurisdiction, equipment types, insurance mandates, warranty rules, or the like.

The lockout-tagout procedure enables an operator or mechanic to lockout a broken or unsafe machine for repair or maintenance. For example, an operator may notice a large amount of oil or hydraulic fluid leaking from under a machine during normal operations. The specific lockout-tagout procedures for the particular machine may dictate that the operator immediately stop the machine, lock a particular lever to prevent further operation of the machine, and/or notify his supervisor. The supervisor may review the lockout to determine whether any additional machine locations require lockout. For example, in addition to locking the lever, the affected machine may require lockout of the electrical circuit breaker. The supervisor then places a lock on the lever (in addition to the lock placed by the operator) and a lock on the electrical circuit breaker. The supervisor may also notify the operator to place his lock on the electrical circuit breaker. The lockout process may require any number of affected users (operators, repair technicians, supervisors, etc.) to place one or more locks on the machine. Each of these individuals may unlock and remove their lock before returning the machine to regular operation.

Machines, devices, attachments, and components of machines are increasingly computer-controlled. For example, what may have previously been controlled by a lever or physical switch, may now be software-controlled via electronic signals. Accordingly, instead of locking a lever or physically switching a breaker, a software user interface may be used to electronically lockout (e.g., disable, turn off, etc.) the device or component.

A supervisor or operator may notify an authorized user (e.g., a repair technician) to request an authorized repair on the machine. Prior to performing any repairs, the authorized user may place yet another lock on the machine's lever and electrical circuit breaker. For the safety of the authorized user, the machine must not operate (or be operated) while performing the necessary repairs. For example, if the operator uses the machine while the authorized user is replacing the oil and fixing the leak, hazardous energy may harm or kill the authorized user. The authorized user may need to pass the completed repair through his "lead," an authorized user in charge (e.g., a lead repair technician), who certifies that the authorized user has authority to perform the repair and/or that the authorized user has completed the repair correctly.

With physical locks, each operator, authorized user, supervisor, and any other person potentially affected by the hazardous energy of the machine may place an individual lock with a separate key. As systems, devices, and components switch to being electronically computer-controlled, it may not always be possible to place multiple locks. The systems and methods described herein allow for a software-based multiple user lockout of electronic computer-controlled machines, attachments, components, and other devices.

A network-enabled digital lock may allow a user to add additional keyholders that must each approve/unlock the machine with their own digital key or credentials. Until all parties have approved with their digital key, the digital lock remains locked and/or the machine, attachment, component, or other device remains disabled. Users can add other affected parties (e.g., authorized users, supervisors, and/or authorized users in charge) as keyholders to a digital lock. For the digital lock to release the control, all keyholders must remove themselves as keyholders from the digital lock. In some embodiments, an operator may manually add additional keyholders to the group. In some embodiments, the machine or machine location may store a list of default keyholders for a lockout procedure to enable an authorized repair, and auto-populate required or suggested keyholders. Each party may only unlock the device with his or her individual credentials (may be referred to as the digital key), and all keyholders must approve the completion of the work by removing themselves as active keyholders prior to unlocking the machine and/or machine location. As such, an operator may add an authorized user to the lock but cannot remove the authorized user once added. In some embodiments, credentials used to lock or disable a device may be role-based, as may be the "users" added to a lock.

In such embodiments, software-based locks may be unlocked and/or devices enabled by individuals having role-based credentials. If an individual with a role of "technician" locks-out (e.g., disables or digitally locks) a device and then goes home, a different individual with the same role of "technician" may unlock (e.g., enable or digitally unlock) the device. In other embodiments, each individual has unique credentials that must be entered to unlock a device, unless an authorized individual exercises "bolt-cutting" authority to electronically override the credentials of other users.

The lockout-tagout process generally starts with the observation of a defect (e.g., by the operator) or required scheduled maintenance. Such circumstances require an authorized user to repair a machine capable of injuring or killing the authorized user. Either the operator or the authorized user may begin the lockout process by scanning machine identifying information. For example, a specific location on a machine may include a QR code, a serial number, or other identifying attached to, or near, the machine location. Once identified, a user may add any number of keyholders. In some embodiments, the machine location may identify and auto-populate default (e.g., necessary) keyholders.

For example, an operator, "Bob," notices the machine is vibrating and causing a hazard to passersby. Bob scans the QR code, locks the machine, and adds his supervisor "Jim." Jim inspects the lockout and adds two authorized users (e.g., repair technicians) "Steve," and "Dave" to repair the vibrations. "Toby," the authorized user in charge, is added by Steve and/or Dave to approve their authority to make the requested repairs and to inspect the completed repair. Charles, a safety manager, may have bolt-cutting authority and be added as a keyholder as well. Bolt-cutting authority is the authority to override a lock. Bolt-cutting authority may be granted to any number of users associated with the system. In some embodiments, an electronic locking system or a device associated with the digital lock may request more than more user to authorize a bolt-cutting override. In the example provided above, the digital lock may be a software-based lockout of an electronically controlled (e.g., computer-controlled) machine, vehicle, attachment, component, machine "location" or another device.

The machine "location" refers to one or more hazardous areas created by or inherent in a particular machine. The machine location may identify a list of all the keyholders that should be, will be, can be, and/or are by default associated with that location. For example, an electrical breaker may require locking to prevent operation of a vibrating machine. The machine may require locking a mechanical lever or be computer-controlled via hardware and/or software. Instructions on the GUI of a mobile application (e.g., on a mobile phone, tablet, laptop, or Human Interface Device (HID) of the machine itself) may guide Bob through the various machine locations for a proper lockout of the entire machine or a subset of machine locations based on an identified problem. Additionally, Bob may specify the locations locked, describe them with text, videos, or images, and/or confirm placement. In various embodiments, the system may provide specific instructions, including pictures or videos, regarding the steps Bob must take to lockout that location of the identified machine.

The system may also notify authorized users (e.g., repair technicians) of the addition of their names as keyholders on the machine. The automatic notification may occur once, repeat every hour, day, week, or month depending on the inputs of the machine and/or operator, authorized user, and/or another affected party.

Keyholders may be added before or after establishing the lockout. The system may provide specific instructions on how to establish the lockout at the desired location. The confirmation or certification of completion of the lockout (or portion of a lockout) may be performed in a manner to satisfy legal or regulatory requirements or to provide useful documentation.

The system may require the operator (or another user) locking the machine to provide a summary before or after the lockout is established. The summary may provide notes, observations, attempted methods to repair safely, or proposed repairs for the machine. The summary may state the required timeline for the repairs. For example, how urgently the operator needs the machine. The system may request, in the summary section, specific comments on the problem and any perceived causes or repairs required.

Once the lockout is complete and the user has provided a summary, the system may ask for another QR code (e.g., for another machine location). The QR code may define another affected machine (e.g., downstream of the original machine), or may define another machine location of the same machine. For example, a single machine's lockout procedure may require software or electronically controlled hardware lockout of a hydraulic line (e.g., electronically disable a pump or valve). The QR code may be specific to the machine and/or location(s). In some embodiments, when the operator scans a QR code machine and location fields may auto-populate. A wide variety of identifiers may be used instead of or in addition to QR codes, including text identifiers, barcodes, shapes, images, RFID tags, NFC devices, Bluetooth transceivers, or the like.

Once the operator has completed his ticket requesting the repair and adding necessary keyholders, an authorized user may begin the repairs. The authorized user may confirm that he or she is a keyholder on each of the digital locks on the machine to confirm that repairs can be safely made. Because only the authorized user can remove himself or herself as a keyholder on the various locks, the authorized user can be confident that no other person will accidentally engage or initiate the machine while he or she is working on the machine.

Upon completion of the repair, the authorized user (or authorized user in charge) may describe any work performed in the work description section of the application. In some embodiments, the authorized user cannot complete his authorization (and subsequent removal himself as a keyholder) until he uploads a photo of the completed repair. The system can store and organize these inputs as a complete record or file (e.g., for OSHA audits). The real-time documentation relays information over the network to all affected parties. The real-time information reduces errors, decreases repair time, and allows for documentation that is more efficient. Upon submission of all the necessary documentation, the authorized user may digitally unlock his electronic key.

For example, Steve and Dave (authorized users) can remove their digital keys upon successful completion of the repair. Steve, Dave, or the system may notify (e.g., either manually or automatically) Toby to certify the repair. Upon inspection, Toby, the authorized user in charge, may remove himself as a keyholder from the digital lock(s) and notify operator Bob. The system (e.g., via a messaging system, SMS message, page, email, call, etc.) may notify Bob's supervisor, Jim, and bolt-cutter-authorized Charles that Toby has removed himself as a keyholder and has authorized the machine to be brought online. Bob may then approve/unlock the device through his digital key remotely over the network connection or via close-proximity Bluetooth, NFC, or the like. His supervisor, Jim, may approve once he reviews the lockout procedure and confirms that Bob unlocked his device.

It is possible that one keyholder may not be available to remove himself or herself as a keyholder. Charles may use his bolt-cutter authority to approve the repair for anyone unable to unlock their device. When all other keyholders approve/unlock the device, Charles may review the notes, summaries, histories, etc. and determine that the remaining keyholders are not necessary keyholders and may be simply removed via his bolt-cutter authority. In some embodiments, two users with bolt-cutting authority are required to override the digital lock.

One feature of the systems and methods described herein is that a user can add multiple, specific authorized keyholders to the digital lock, but that same user may not be able to remove those same keyholders from the lock unilaterally. Aside from managers or other entities with "bolt-cutter authority," each named individual is the only person that can remove himself or herself as a keyholder. Each individual may, for example, be the only person in possession of their unique digital key. Accordingly, each person added to the digital lock is required to input their digital key to remove the digital lock. In addition, the ability to complete all the "paperwork" and add keyholders electronically reduces the hardware, paperwork, and coordination ordinarily required to lock and unlock the device. In other words, the systems and methods described herein can automate and/or improve the efficiency of many of the processes involved in a lockout-tagout procedure.

In some circumstances, a person may not have access to the device after an approved repair. For example, Jim, the supervisor of operator Bob, may travel to another worksite. While away, Jim may not be available connect to the device via Bluetooth to remove himself as a keyholder. Bob may call Jim and request him to unlock the device and/or send an electronic request via the application. Jim can open his mobile application, obtain a passcode or pin (e.g., a single-use passcode) and supply the pin/passcode to Bob via an out-of-band communication (e.g., text message, phone call, email, etc.) or via the application. Bob can then enter the pin/passcode and unlock the device on Jim's behalf. The system may document a record of the creation of the passcode by Jim and the entering of the passcode by Bob.

The system may enable real-time monitoring of lockout procedures. A manager or supervisor may have an interest in monitoring the operation of his machines and ensuring that any lockouts comply with OSHA requirements, company policies, and/or other established practices. The system may identify completed lockouts and partial lockouts. "Completed" lockouts comply with OSHA or other regulatory standards, company policies, industry standards, or the like, and have all required documentation and locks confirmed in place. "Partial" lockouts indicate that the process is incomplete. A partial lockout may clearly identify a machine or equipment that has a problem (e.g., needs repairs), but that not all digital locks are in place or the lockout does not conform to OSHA or other industry, company, or regulatory requirements. The system gives real-time information monitoring capabilities on the operation and safety of the system.

Keyholders may have varying levels of access to the system and may add notes, look at the lockout steps, and add/or add additional keyholders (e.g., affected parties). In addition, tag/ticket numbers may be associated with photos to help identify the problem and any repairs. Keyholders may have a specific screen (GUI) in a native or web-based application to authorize and unlock their digital key.

In some embodiments, users may utilize a desktop application or web-based application in addition to or instead of a mobile device application. With proper login credentials, a user may perform all the features described herein. In some embodiments, additional information, setup options, customization options, and/or other advanced features may be available via a desktop or server-based application. Once logged into the desktop system, a user may select different types of machines based on the model number, identification number, serial number, model number, manufacturer, name, or other selectable attributes. The user may use the application to set up the lockout procedures, required lock locations, required confirmations, default keyholders, and/or other aspects of the mobile-side application. For example, a specific type of machine may be configured to require an electrical system lock, a chemical system lock, a hydraulic system lock, a pneumatic system lock, a mechanical system lock, a residual system lock, and a pressurized system lock.

The user can view different machines to determine machine attributes and digital locks required to lockout the machine. For example, the digital lock on a mechanical system may have different requirements than the digital lock on a hydraulic system. The desktop application may identify a series of machines of the same type with different identifiers, serial numbers, or other identifying features. The system may enable a user to search past issues with the type of machine to determine previous processes followed. The desktop application may also indicate whether a machine of interest is active or inactive (e.g., in operation or not). The desktop application may also indicate any potential users, operators, authorized users, authorized users in charge, supervisors, managers, or other affected personnel.

The desktop application may enable queries on network-enabled digital locks and their status (e.g., locked or unlocked). The user may search digital locks by name, MAC address, status, or other identifying features. The results enable further inquiry into, setup of, customization of, and/or deletion of each digital lock.

Although described for lockout procedures, not all machines and equipment can be fully "locked out." For example, some machines may not be rendered safe by simply locking various locations. Tagout procedures may be used to provide notice of the problem. Operators and authorized users may utilize tagout procedures alone (i.e., without a lockout procedure) when a machine is not capable of being locked. Instead, a "tag" attached to the machine warns the affected users of potential danger. A person with ordinary skill in the art would recognize that the same lockout procedures described above would apply to a tagout procedure, but with a warning tag instead of locking the machine. For example, the disclosure also enables real-time monitoring of a tagout procedure that complies with OSHA or other regulatory requirements, company policies, industry standards, established best practices, or the like. Instead of locking the machine, a network-enabled device can track all the approval of all necessary keyholders. Many computer-controlled devices may include or be associated with electronic displays (e.g., LCD displays). In such embodiments, tagout information may be entered and/or displayed to other individuals via the electronic display of the lockout-out and/or tagged-out machine (or another device type).

This disclosure also describes various systems and methods that allow a user to unlock the machine by providing a pattern of inputs via an input device associated with the digital lock.

Some of the infrastructures that can be used with embodiments disclosed herein are already available, such as general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. Networks and wireless communication generally encompass a wide range of electromagnetic radiation communications frequency bands, modulation protocols, encoding, encrypting, communication protocols and hardware protocols.

Examples of suitable protocols and technologies include, but are not limited to, 802.xx protocols (e.g., Wi-Fi), Bluetooth protocols, near-field communication (NFC) protocols, radio frequency identification (RFID) protocols, ZigBee, Z-wave, BACnet, 6LoWPAN, RPL, CoAP, cellular protocols (e.g., 4G LTE), Thread, Sigfox, Neul, LoRaWAN, and/or various protocols using the ISM bands in the U.S., SRD bands in Europe, and the like in other jurisdictions.

Related networks may also include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. In some embodiments, virtual networks and software-defined networks may be utilized.

Aspects of certain embodiments described herein may be implemented as software modules or components. As used herein, a software module or component may include any type of computer instruction or computer executable code located within or on a computer-readable storage medium, such as a non-transitory computer-readable medium. A software module may, for instance, include one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

Some of the embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1 illustrates a user 110 locking out a portion of a wirelessly-connected machine 102 via a mobile device 106, according to one embodiment. The machine 102 includes a computer-based machine controlling device 104 and a machine location presenting a hazard (e.g., hydraulically controlled blade 108). Machine 102 represents any of a wide variety of machine types, such as a harvester, a bulldozer, a hazardous energy machine, a wood splitter, drill press, saw, molding machine, press, or other industrial, commercial, or manufacturing machinery. The machine controlling device 104 may be physically incorporated or attached to the machine 102 and/or the machine controlling device 104 may be wirelessly connected to the machine 102. The machine controlling device 104 may electronically control the machine 102. For example, a device may selectively enable and disable the blades of a harvester.

Further, if a user 110 places a digital lock on the machine 102 utilizing the locking application, the device 104 may prevent the ignition from starting. A remote user 110 may use the mobile device 106 to instruct the control device 104 to lock the machine 102 and prevent further operation by anyone, including operator 112 until the user 110 unlocks the control device 104. The machine 102 may be locked out by preventing the machine 102 from starting, preventing the machine location from moving, preventing hazardous machine locations (e.g., blades 108) from functioning, and/or preventing other functions of the machine 102 from occurring or being operating.

In some embodiments, the machine 102 and the mobile device 106 are wirelessly connected. In some embodiments, the machine 102, the control device 104, and the mobile device 106 are wirelessly connected. In some embodiments, the user 110 and/or operator 112 may lock the machine 102 directly from the device 104. For example, the operator 112 may detect a problem and lockout the hazardous location 108 via the control device 104. The user 110 may be a repair technician. Rather than trust that the operator 112 will not engage the machine 102 or enable the hazardous location 108 during repairs, the user may add his or her own credentials to the control device to disable the hazardous location during repairs. The control device 104 prevents operation of the hazardous location 108 until both the user 110 and the operator 112 have entered their credentials to enable the hazardous location.

As another example, an operator of a harvester may notice the machine acting abnormally. The operator may place a digital lock on the harvester utilizing the lockout application. He or she may use a personal electronic device (e.g., such as a mobile phone, tablet, etc.) to lockout the harvester and prevent the harvester from starting. The operator may choose to lockout the machine from a hardware device attached to the harvester or via an integrated computer system associated with the harvester. For example, the harvester may have an onboard computer and/or computer-controlled equipment. The operator may place a digital lock on the harvester via the onboard computer. Additionally and/or alternatively, a technician or supervisor may choose to lockout the harvester via the onboard computer or a remote device associated with or connected to the harvester.

An operator may determine the machine is malfunctioning, and it is no longer safe to operate, and the operator may utilize the onboard computer to enter his credentials to the digital lock. The operator may then alert a supervisor. The supervisor may inspect the machine 102 and determine the machine is malfunctioning. The supervisor may then place credentials on the digital lock. The supervisor may determine the machine's problem and add the credentials of the appropriate technicians to the digital lock. For example, if the supervisor determines the blades and the engine are malfunctioning, the supervisor adds technicians capable of making the necessary repairs. In some embodiments, it may be the same technician. Once the repairs are complete, the technicians remove their credentials/digital keys from the lockout. Once the supervisor determines the repairs are correct, the supervisor removes his or her credentials from the digital lock. Once the operator confirms that the machine is safe again, the operator removes his or her credentials from the digital lock(s) on the machine.

Once all the credentials are removed from the machine, the machine is released from the digital lock and/or unlocked or enabled. In some embodiments, the device or machine associated with the digital lock may allow users to lock the digital lock when the device is offline, but the device may not allow users to unlock the digital lock when the device is offline. In such embodiments, server- or cloud-based confirmation of authority or user-identify is required to unlock a device. If credentials are entered when the machine communication system is offline, the machine may store the unlock authorization until confirmation can be confirmed when the machine is back online.

Figure 2:
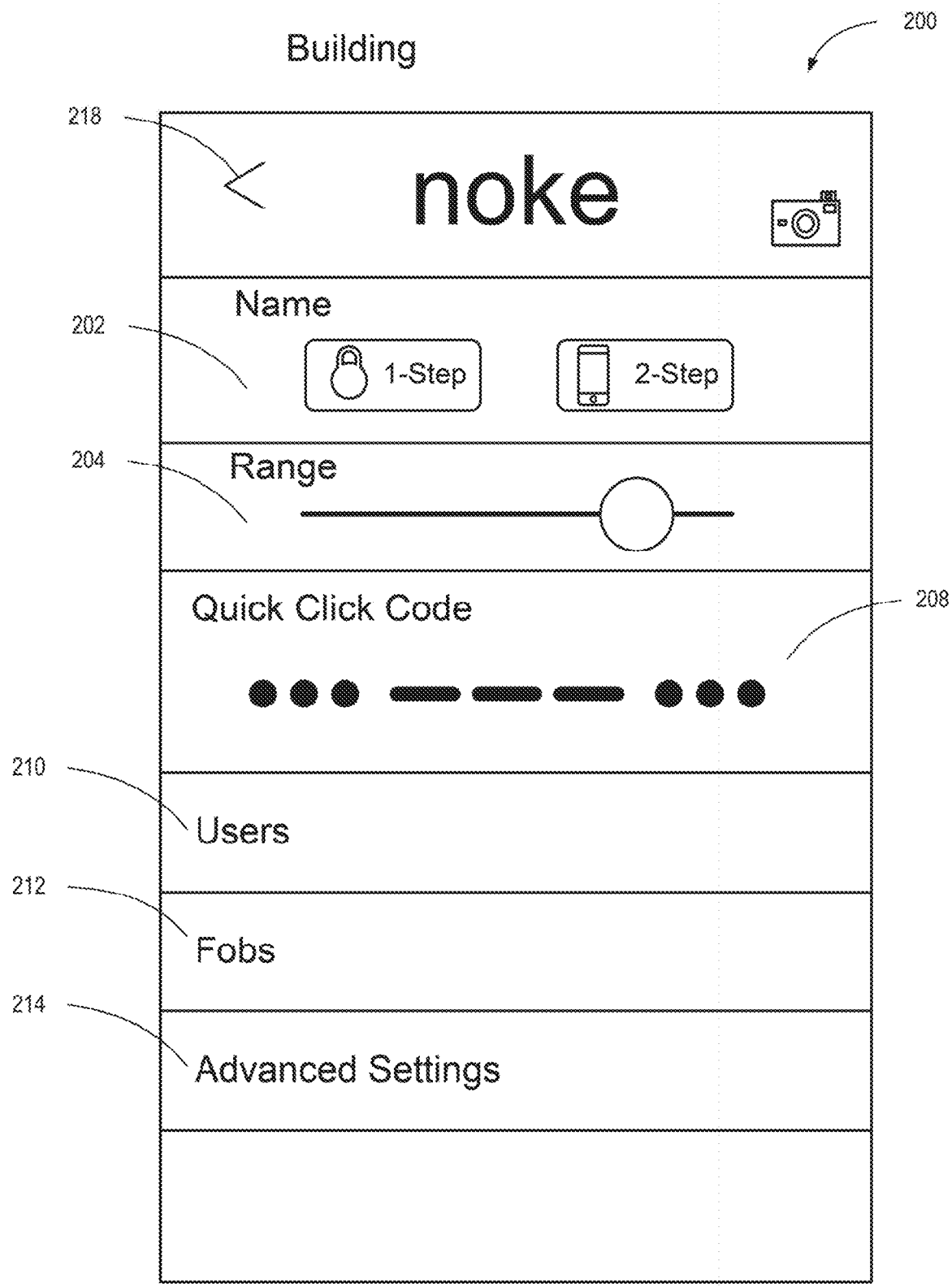
FIG. 2 illustrates a portion of an interface of a software program for actuating, controlling, and configuring wireless-enabled digital locks to enable and disable machines and machine components.

FIG. 2 illustrates a portion of an interface 200 of a software program for actuating, controlling, and configuring a wireless-enabled locking. In some embodiments, the digital lock may be placed utilizing a locking application on a device that is not wireless-enabled. A user may access the locking application with the illustrated interface on a laptop, computer, mobile phone, tablet, etc. In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., pin, username/password, token, biometrics, etc.) into a single user interface.

In some embodiments, a user interface of the application may allow a mobile device to be paired for faster access in the future. In some embodiments, establishing a digital lock may be programmed with a default set of inputs for authentication. Providing such inputs may authenticate the digital lock, allow pairing, and/or allow for various configuration settings. In some embodiments, the pairing may include Bluetooth or ZigBee pairing, for example.

In some embodiments, a local access point or a central server may be utilized for all digital locks on the system. In some embodiments, each digital lock may be associated with one local access point and/or a local server. In some embodiments, each machine (e.g., machines to be locked out) may be associated with one local access point and/or the local server. For example, a machine may be locked out using three locks. The three locks of the machine may be associated with one local access point. The digital lock(s) of a second machine may be associated with a second local access point.

In some embodiments, the local access point and/or local server may control a region of machines and digital locks. For example, multiple machines located in "building B" or the machines located within 20 meters of the local access point and/or local server may be associated with a common local access point and/or set of common local access points (e.g., access points in primary/backup or primary/primary configuration). In some embodiments, the local access points and/or local server may be synchronized with the central server instantaneously and/or synchronized with the central server when a connection becomes available. In some embodiments, a local access point may receive and authorize (or reject) credentials for locking and unlocking the digital locks associated with the local access point, even when the local access point is offline with respect to a centralized server.

As illustrated, a logo of a servicing company and/or hardware manufacturing may be displayed in 218. In some embodiments, the name may be customized by the operator. In some embodiments, a picture can be added to associate an image with a specific log visually.

An authentication option 202 may be selected as either 1-step or 2-step. In a 1-step authentication, the digital lock may be activated and then automatically be authenticated by the application running in the background of a mobile device. In such embodiments, users need not remove anything from the pockets or bags. With 1-step authentication, authentication occurs in a single user step. That is, activation of the digital lock (i.e., transitioning to a state wherein the machine/device is listening and/or pinging mobile devices to request wireless authentication therefrom) is all that is required to authenticate the lock and allow it to be unlocked.

In 2-step authentication mode, the digital lock may be initiated, but the application will not automatically provide the authentication information—even if it is running in the background. Instead, the user must open the application and select an "unlock" option to send the authentication signal to the digital lock.

In some embodiments, authentication may include real-time confirmation that the user (e.g., the technician) is certified to repair, maintain or otherwise alter the device or machine. In some embodiments, authentication includes comparing the user credentials to a credentials database. In some embodiments, the credentials database may be owned and maintained by a third party. In some embodiments, the credentials database may be maintained by the operator of the lock system and the lock system may be provided to the user as a SaaS model. In some embodiments, the credentials database may be maintained by an owner of the devices utilizing the locking system (e.g., the machines being locked out).

In some embodiments, the credentials database may maintain user certification to ensure the user is authorized. In some embodiments, the credentials database may require technicians to provide or update certifications periodically. If the user is not authenticated, the user is not authorized to lockout the machine and/or the digital lock, locking system, local access device, and/or the device; and/or the machine is locked out may send a notification to the user's supervisor. If the user is authenticated, the user may lockout the machine and start working. In some embodiments, a notification may be sent to the user's supervisor and/or other related parties informing the supervisor and/or another party that the user started working on the device.

In some embodiments, credentials utilized by a user to lock the device may be different from the credentials utilized by the user to unlock the device. For instance, the user may utilize a pin to lock the device and a user ID card (e.g., a driver's license, passport, company-issued identification) to digitally unlock the device. The user ID may be scanned by an electronic tablet, phone or another device. In some embodiments, the user may be required to utilize one type of credential for digitally locking the device and a different type of credential for digitally unlocking the device. Credentials may include but are not limited to tokens, passwords, pins, chips, ID card, biometrics (e.g., fingerprints, facial recognition, retina recognition, voice authentication, etc.), one-time passwords, one-time pins, scratch-off cards, magnetic stripes, knowledge-based questions, questions based on personal information, smart cards, graphical passwords, or any combination of these or other credentials.

In some embodiments, a distance range 204 may be selected by a slider or by inputting actual numbers to select a distance at which the mobile device will be able to send the authentication signal to the digital lock. A small range may require the user to be standing proximate the device associated with the digital lock. A large range may allow the user to stand several feet, or even tens or hundreds of feet, from the device associated with the digital lock and still have the authentication signal transmitted to activate the digital lock.

For example, if Bluetooth 4.0 is used, the maximum may be about 10 meters (if the communication radius is about 10 meters). Other technologies and version of Bluetooth may allow for longer range, faster communication, and/or lower power consumption. The distance slider 204 may be selectively moved anywhere between the minimum distance and the maximum distance on the distance slider 204 to set the distance at which the authorized mobile device can unlock the digital lock. Accordingly, the distance at which an authorized mobile device can unlock the digital lock may be set anywhere in the range from the minimum distance to the maximum distance. In some embodiments, the distance between the authorized mobile device and the device associated with the digital lock may be determined based, at least in part, on a received signal strength of communications between the mobile device and the device associated with the digital lock (e.g., a received signal strength of signals the digital lock receives from the mobile device, a received signal strength of signals the mobile device receives from the digital lock or combinations thereof.

By way of non-limiting example, different distances between the mobile device and the device associated with the digital lock may be correlated to different received signal strength levels (e.g., decibel power levels). A processor associated with the device where the digital lock is placed, a processor of the mobile device, or a combination thereof may determine the distance between the mobile device and device associated with the digital lock.

In some embodiments, once the authorized mobile device enters within the defined distance from the digital lock (e.g., which may be detected by the mobile device, the digital lock, the device associated with the digital lock or a combination thereof by a received signal strength reaching a level correlated with the defined distance), the digital lock may unlock/be removed (e.g., automatically upon the mobile device entering within the defined distance from the lock, after further authorization steps, etc.). In some embodiments, the digital lock may unlock automatically responsive to a detection of the mobile device entering within the defined distance from the digital lock. In some embodiments, such an automatic unlocking feature may be turned on and off by the user. In some embodiments, an additional authorization may be required in addition to the mobile device entering within the defined distance. By way of non-limiting example, a predetermined series of physical interactions with the application associated with the digital lock may be required in addition to, or instead of, the mobile device entering within the defined distance from the device associated with the digital lock.

In some embodiments, even absent an authorized mobile device (e.g., a user forgot a mobile device or a battery of the mobile device is depleted), the digital lock may be unlocked using the series of physical interactions on the application associated with the digital lock. For example, the user may utilize the lockout device to enter the series of physical interactions. The pattern of physical interaction may be displayed 208 and modified by the user. A dot may represent a short "tap" and a dash may represent a long "slide." The general sense of requiring physical input interactions of some form, although they may not strictly comprise an actual "tap" or "slide." For example, the series or pattern of physical interactions may be provided via a button, switch, toggle, light sensor, motion sensor, resistive touch sensor, capacitive touch sensor, and/or other physical input sensors on the device associated with the physical lock.

Various users can be authorized to be the owner or administrator of the digital lock, at 210. For example, an administrative user can define permissions for an authorized user (and/or invite a new user to accept permissions to the digital lock). The machine, machine location or access control associated with the digital lock can be identified in a title location. An authorized user can be identified by a user identifier (such as an email, login, name, phone number, blockchain-based identity, or other identifying information, etc.). Permissions may be tailored to the user. Permissions may be set for permanent or single use, or further refined by days, times, and/or an expiration date applicable to each user In some embodiments, a user can set up an account with the locking application service using an application on the mobile device. The user registers with the application server. The locking application service may store user credentials in storage and associate the user credentials with a locking identifier (e.g., a unique 16-digit code) for the machine, machine location or access control. The user may then invite other users to join the lock application service and grant other users permissions to lock the machine, machine location or access control digitally. Permissions can be restricted to days, times, a number of times unlocking is granted, a period of time, a repeating schedule, and/or other restrictions on timing and use of the digital lock on a particular machine location. Timing restrictions may be based on the mobile device's timer or on the lock application service's timer, which can be accessed directly or via the mobile device's Internet connection. Permissions may be stored in the storage. Third parties may be given different levels of access. For example, an owner of the locked machine may have master authority. Owners with master authority may have the authority to grant permissions to third parties. For example, if the digital lock was used to secure a machine, and the owner wanted employees to be able to use the machine during certain hours, the owner may give each employee permission to unlock the machine by digitally unlocking the machine.

That permission could be primary or secondary, where primary may be associated with greater privileges for managers and secondary may be associated with fewer privileges for low-level employees. For instance, a primary authority user may be able to share permissions with other people, whereas the secondary authority user could not. However, at any time the owner, due to the owner's master authority, may revoke any permissions. Depending on the embodiment, permissions can be stored locally on the device associated with the digital lock (e.g., the machine's computer, the lock device, etc.) and/or in the lock application service. For example, when permissions are stored solely by the lock application service, the mobile device may receive notification of the digital lock over Bluetooth. The mobile device can transmit credentials to the device associated with the digital lock. The device may send the credentials (or a message based on the credentials, e.g., a cryptographic hash) to the lock application service (potentially via the mobile device) for determination of whether the mobile device is authorized to unlock the digital lock.

Authentication and/or authorization may be done directly by the machine controlling device associated with the locked machine or via the mobile device's Internet connection. The locking application service may transmit a message indicating authorization or failure and log the attempt in the logging service. If authorization is successful, the digital lock is allowed to be unlocked. If authorization is not successful, the digital lock remains and provides an indicator of the failure (e.g., light, sound, etc.) via the device associated with the digital lock.

Alternatively, the lock application service may not be queried every time an unlock attempt is made. For example, lock application service verification for a mobile device may be required every time, hourly, daily, weekly, monthly, or never. The frequency with which lock application requires service verification may be defined or customized by the owner of the locked machines. The more secure the owner wishes the digital lock to remain, the more frequently the owner can require lock application service verification. The security level associated with the authentication frequency requirement may be represented by a sliding scale from less secure to more secure in which the most secure option may require a server or third-party authentication permission each time the digital lock is accessed. The least secure option may never require a server or third-party authentication permission.

In another example, when permissions are stored solely by the lockout, the lockout may connect to the mobile device over Bluetooth. The mobile device may transmit credentials to the lockout device. The lockout may determine whether the credentials match credentials available locally to the lockout device. If a match is found and the user is authorized, the lockout device may allow the machine, machine location or access control to unlock. If the user is not authorized, the lockout device may stay in the same state and provide an indicator of the failure (e.g., light, sound, etc.).

In one example, when permissions are stored by the lockout device and the lock application service, the lockout device may be transitioned to an awake state by user interaction and connect to the mobile device over Bluetooth. The mobile device can transmit credentials to the lockout device. The lockout device may determine whether the credentials match credentials available locally to the lockout device. If a match is found and the user is authorized, the lockout device may transition to the releases state relative to allow the lock to be established. If no match is found, the lockout device may send the credentials (or a message based on the credentials, e.g., a cryptographic hash) to the lock application service for determination of whether the mobile device is authorized to unlock the machine, machine location or access control associated with the digital lock. The lock application service can transmit a message indicating authorization or failure to the locked device and log the attempt in the logging service. If authorization is successful, the digital lock can transition to an unlocked state and release the digital lock. If authorization is not successful, the lockout device can stay in the same state and provide an indicator of the failure (e.g., light, sound, etc.). In some embodiments, the beacon can be transmitted over the second communication channel, and only one communication channel is used.

Logged history can be made available to a user of the lockout device (e.g., an owner, an administrator, an authorized user, etc.). History may include various events, attempts, and permissions related to the digital lock associated with the machine, machine location, and access control. The history can include a status of the digital lock (locked, unlocked, etc.), prior status of the digital lock, user requests received, failed attempts, successful attempts, network connectivity issues of the device associated with the digital lock, last updates, updated permissions, and/or other interactions with the digital lock or the lock application service.

For example, a commercial real estate agent may use the digital lock to show an office building. Instead of a lock on the door requiring a potential buyer to get a physical key, the digital lock would conveniently allow the real estate agent to grant access to the office building to anyone for a limited and potentially specific amount of time. Not only could the real estate agent provide this permission, but the agent could also limit it and track how it was used. The real estate agent may view the logged history during or after a showing. For instance, the real estate agent may provide a buyer with permission to access the building between 5:50 PM and 6:50 PM. The real estate agent may be notified that the buyer has been unlocked the digital lock at 5:55 PM and receive another notification that the digital lock has been locked at 6:15 PM. Similar logged information may be stored and/or utilized for computer-controlled machines in industrial, manufacturing, and/or commercial settings.

Figure 3:
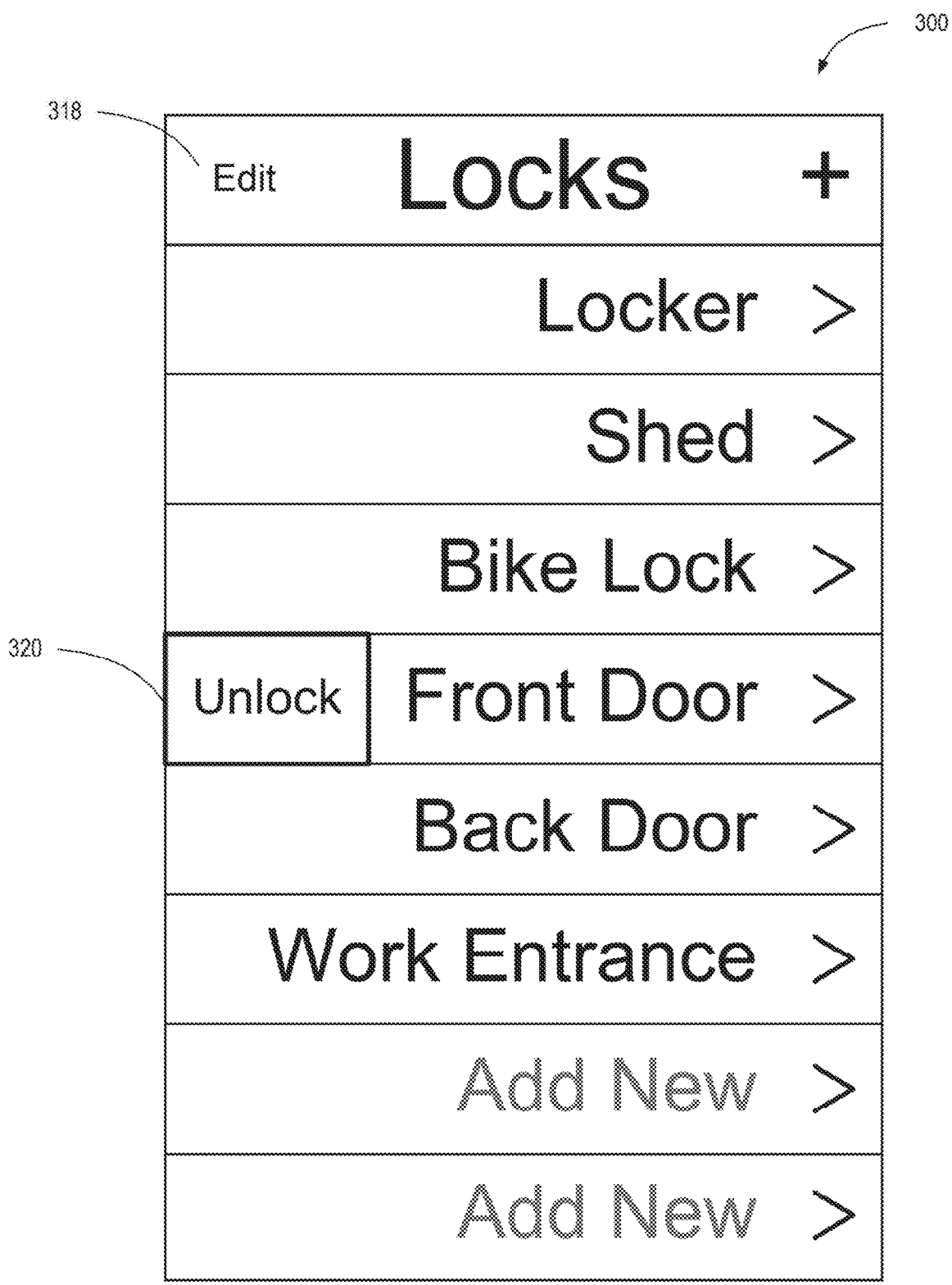
FIG. 3 illustrates another portion of the user interface of the software program for actuating, controlling, and configuring multiple wireless-enabled digital locks, according to one embodiment.

FIG. 3 illustrates another portion of the user interface 300 of the software program for actuating, controlling, and configuring multiple wireless-enabled digital locks, according to one embodiment. As illustrated, a number of digital locks associated with the mobile device executing the application are listed, including a locker, shed, bike lock, front door, back door, and a work entrance. Some of them may be configured in a 1-step authentication configuration, such then when the device associated with the digital lock is active (i.e., not in an idle state), the application will automatically send an authentication code to the device associated with the digital lock to actuate the digital lock and allow it to be opened by the user. Other locks, such as the front door, may have an "unlock" icon 320 and be configured in a 2-step authentication configuration. The user must choose the machine, machine location or access control associated with the digital lock and then open the application and push the "unlock" icon 320 to send the authentication credentials to the digital lock.

Figure 4:
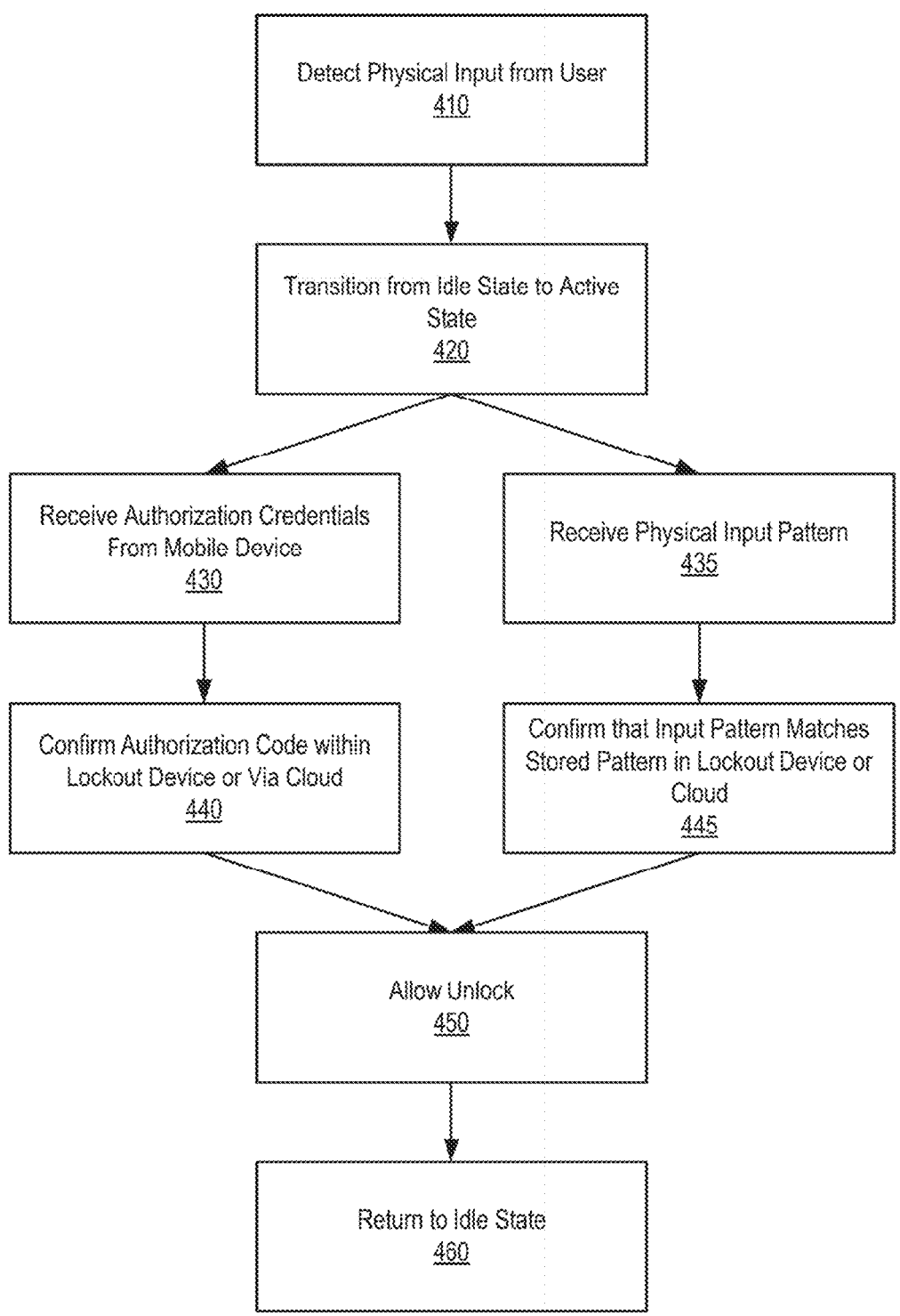
FIG. 4 illustrates a flow chart of one embodiment of a method for unlocking a wireless-enabled digital lock.

FIG. 4 illustrates a flowchart of a method of operation of a lockout. A lockout device may be in a sleep state until a physical input is detected, at 410, by the lockout device. The physical input may be a button press, a screen touch, etc. The lockout device may transition, at 420, from the idle state to an active or activated state. In some embodiments, the transition to the active or activated state may cause the lockout device to send a beacon or other query signal.

In one embodiment, an authorized mobile device transmits an authorization signal to the lockout device. The lockout device receives, at 430, the authorization signal and confirm that the mobile device is authorized, at 440, based on information stored within the lockout device in memory. In other embodiments, the lockout device communicates, via a second communication channel and/or via the mobile device, with a server. The server confirms the authorization signal. In still other embodiments, the mobile device gathers digital lock identification information from the lockout device. The mobile device transmits authorization credential and the lock identification information to the server. The server confirms that the mobile device is authorized to establish the digital lock and the server provides an actuation signal serves to the lockout device (via either a second channel or via the mobile device).

Alternatively, a series or pattern of physical inputs are provided, 435, and the lockout device confirms, 445, that the received pattern corresponds to a stored pattern of inputs. In some embodiments, authentication of the series of physical inputs is handled at the server level as described in any of the embodiments in the preceding paragraph. Once authorized, the digital lock is released. The lockout device may then return to an idle state, 460, to conserve or eliminate the use of power until activated again, at 410. Failure to authenticate via an authorization signal, 430, or via physical input patterns, 435, will prevent the user from actuating the digital lock.

Figure 5:
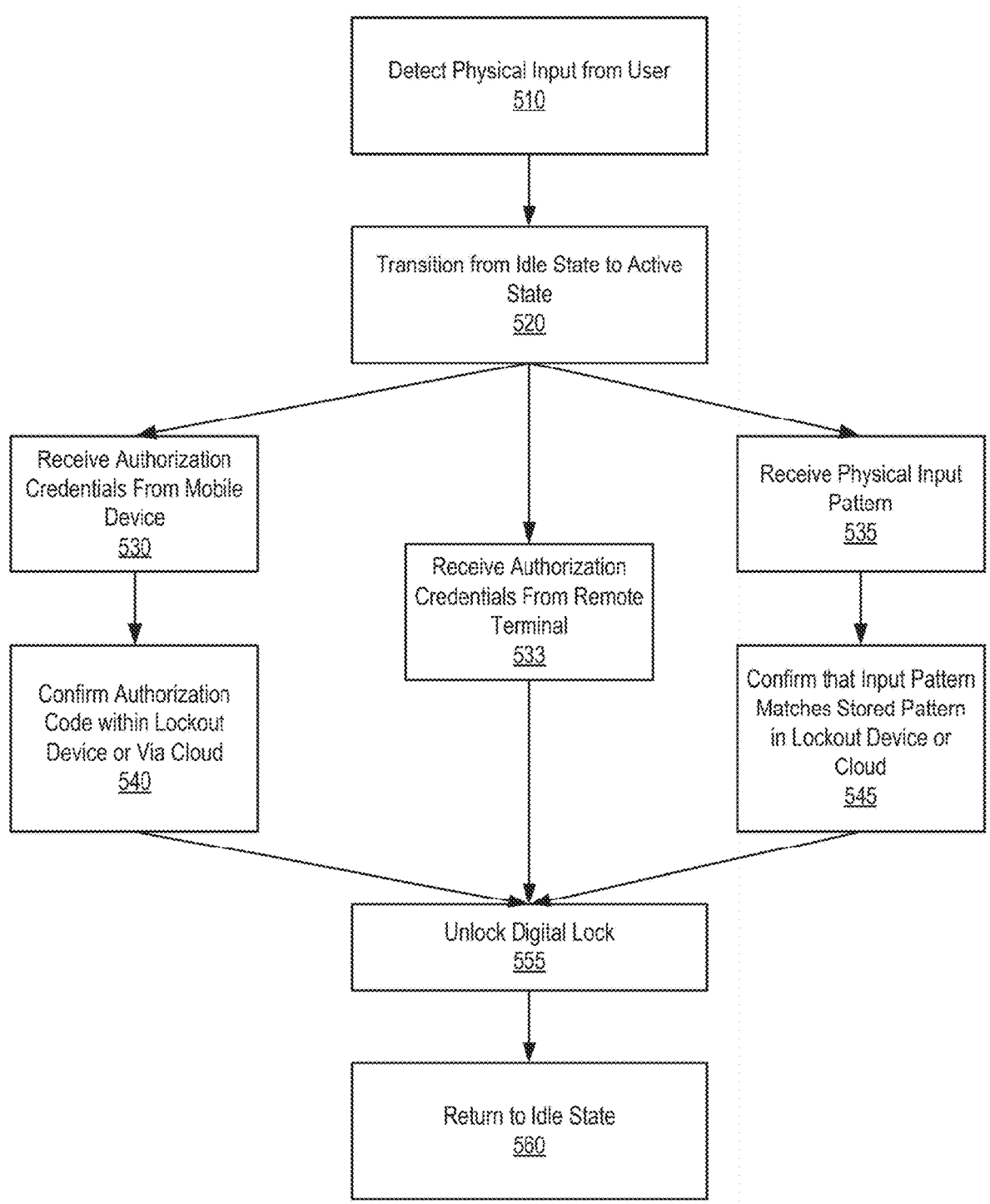
FIG. 5 illustrates a flow chart of another embodiment of a method for unlocking a wireless-enabled digital lock using a remote terminal.

FIG. 5 illustrates another embodiment of a method for unlocking a wireless-enabled digital lock using a remote terminal. Similar to the previously described embodiment, a lockout device may be in a sleep state until physical a physical input is detected, at 510. The lockout device may transition, at 520, from the idle state to an active or activated state. The lockout device receives, at 530, the authorization signal and confirm that the mobile device is authorized, at 540, based on information stored within the lockout device in memory. A second authentication option is presented in which a series or pattern of physical inputs are provided, 535, and the lockout device confirms, 545, that the received pattern corresponds to a stored pattern of inputs. In some embodiments, authentication of the series of physical inputs is handled at the server level as described in any of the embodiments above.

A third authentication option is presented in which the lockout device receives, at 533, authorization credentials from a remote terminal. Thus, the lockout device is engaged, at 555, to allow the digital lock to be unlocked on (i) received authorization credentials from a nearby mobile device, at 530; (ii) received authorization credentials from a remote terminal (e.g., a laptop, tablet, remote mobile phone, etc.), at 533; and/or (iii) a received physical input pattern, at 535. In some embodiments, multiple authentications are required before the lockout device is engaged with the digital lock. For example, a user may be required to provide authorization credentials via a mobile device, at 530, and input a physical input pattern, at 535, and/or have the authorization confirmed by a supervisor at a remote terminal, at 533. The lockout device may then return to an idle state, 560, to conserve or eliminate the use of power until activated again, at 510.

Failure to authenticate via an authorization signal, 530, or via physical input patterns, 535, will result in the lockout device not be engaged with the digital lock. With the lockout device disengaged from the digital lock, the digital lock will remain in effect.

Figure 6:
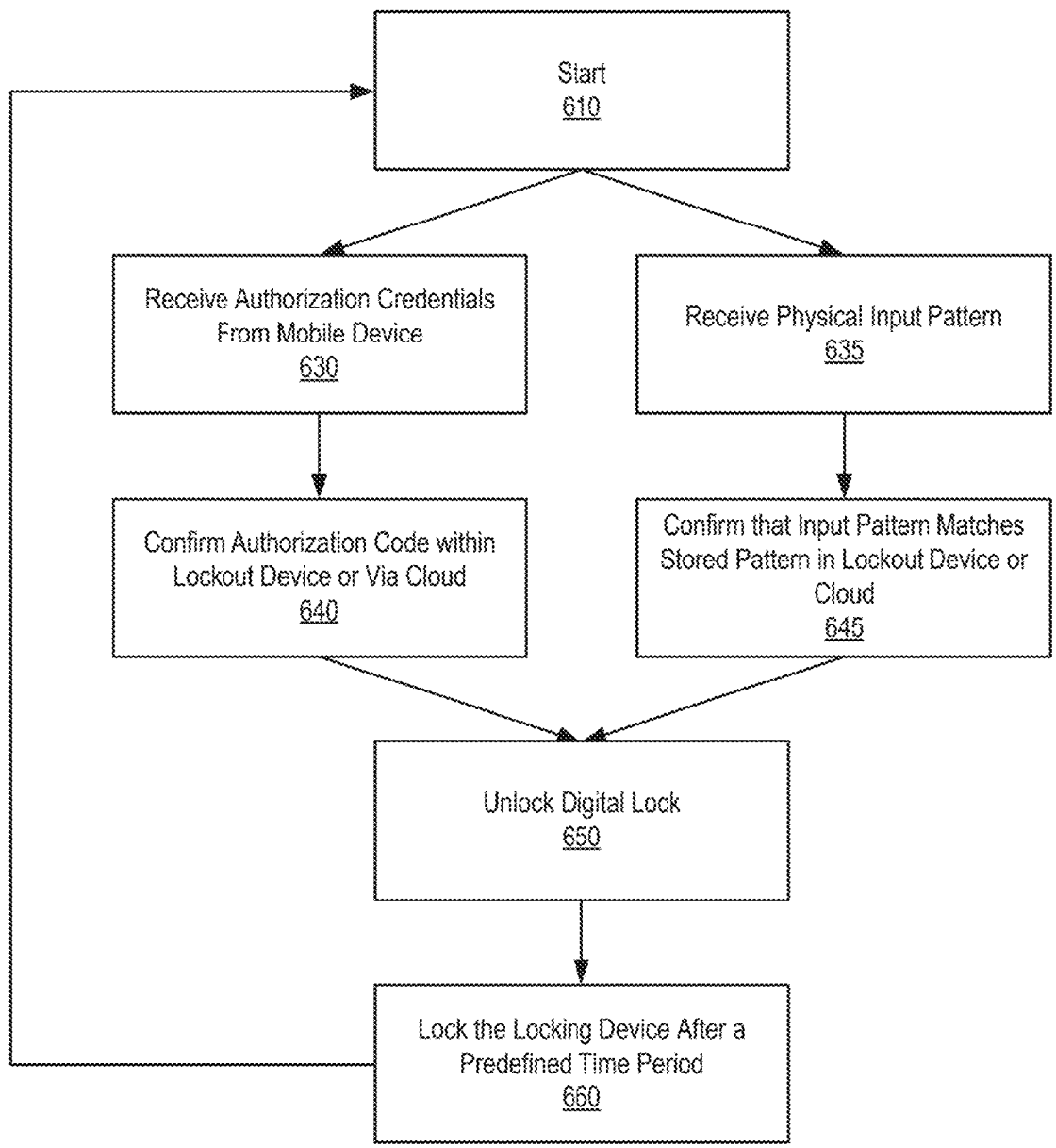
FIG. 6 illustrates a flow chart of another embodiment of a method for unlocking a wireless-enabled digital lock that remains in an active state.

FIG. 6 illustrates another embodiment of a method for unlocking a wireless-enabled digital lock via a lockout device that remains in an active state. As illustrated, the lockout device is ready to start, at 610, without having to transition between an idle and active state. Thus, the lockout device receives, at 630, the authorization signal and confirm that the mobile device is authorized, at 640, based on information stored within the lockout device in memory.

Alternatively, a series or pattern of physical inputs are provided to the lockout device, 635, and the lockout device confirms, 645, that the received pattern corresponds to a stored pattern of inputs. In some embodiments, authentication of the series of physical inputs is handled at the server level as described in any of the embodiments in the preceding paragraph. Once authorized, the lockout device signals to unlock the digital lock, 650. The lockout device may optionally secure or disengage the digital lock after a predefined period of time, at 660.

The lockout-tagout procedures may result in burdensome paperwork requirements and confusion with the number of mechanical locks and keys. Bluetooth (or other wireless-enabled) device associated with the digital lock may operate in conjunction with mobile, desktop, web-based, or client-server application to allow a user to add multiple keyholders to a single digital lock. The digital lock cannot then be unlocked until each added keyholder personally removes himself or herself as a keyholder using his or her digital key. Such digital keys may comprise personal pin codes or passwords, digital keys stored within personal mobile devices, cloud-based digital keys, or the like. In some embodiments, the locking system may utilize blockchain-based digital keys and/or blockchain-based identities for authentication, provisioning of digital keys, adding keyholders, removing keyholders, and/or implementing other features of the systems and methods described herein.

Figure 7:
FIG. 7 illustrates a graphic user interface (GUI) of a mobile application to add one or more keyholders (e.g., affected users) who may lock and unlock (e.g., enable and disable) the associated device.

Referring to FIG. 7, the lockout process on a mobile application (referred to as an "app") generally begins with an observed defect or scheduled maintenance that requires an authorized user to repair the machine. The operator or the authorized user may begin the lockout process. For example, the process may begin by scanning a QR code associated with the defective machine. Although many of the examples provided herein described or illustrate a QR code, other identifying features or information may be scanned or manually entered into the application. For example, an operator may enter or scan a serial number, model number, machine location, defect location, or another code. The machine identification may differ from the machine location. A machine may have several different lockout locations. For example, machine lockout locations may include hydraulic, pneumatic, blades, lifts, and electrical subsystems. Each subsystem may require a distinct lockout to prevent harm. The user may scan a machine location (e.g., through a QR code) or manually enter the location into the mobile application to begin the lockout process.

Once the user identifies the machine location, the user may add keyholders or keyholders may be auto-populated based on the machine location or machine type. For example, "Bob" is an operator that notices the harvester seem abnormal. He suspects the blades are malfunctioning; this malfunction may result in harm to other operators, authorized users who come to repair the machine, or even more generally to passersby. Upon discovery of the defect, Bob scans the QR code to locate the machine lockout locations and adds his supervisor "Jim." The application notifies Jim and two authorized users (e.g., repair technicians) "Steve" and "Dave" immediately.

If two authorized users work on the machine, they may each individually digitally lock the machine to prevent operation of the machine while they are working on it. Regulatory or company policies may require individual lockout by each "affected" person. The authorized users can comfortably work on otherwise dangerous machines and equipment knowing that no other person can initiate operation of the machine until each of them personally unlocks the machine. Thus, traditionally if the machine requires five technicians, lockout procedures require five locks belonging to each authorized user. Here, the ability for a user to add themselves to the digital lock, for example when servicing the machine, enables faster repair times. Since safety requirements may require each technician that works on the machine lock the machine, the systems and methods described herein may encourage and/or simplify compliance.

"Toby," the authorized user in charge, is the lead repairman or technician with oversight authority over both Steve and Dave. The application notifies Toby to confirm Steve and Dan's authority to work on the machine. In some embodiments, the application can verify Steve and/or Dan as authorized users of the machine location. Toby may also certify that the repair is complete. Charles is a manager with bolt-cutting authority. Charles may be added in case any of the keyholders are later unable to remove themselves as keyholders after having completed their assignments (or after having been mistakenly added as a keyholder in the first place). Charles may utilize his bolt-cutting authority to override the digital lock where keyholders are unable to remove themselves as keyholders (or after being mistakenly added as a key holder). Bolt-cutting authority may be granted to any number of users associated with the locking system. In some embodiments, bolt-cutting (i.e., overriding a lock) may require two or more users with bolt-cutting authority.

The locking system may utilize mobile and/or desktop applications to notify keyholders periodically for required tasks related to the machine location lockout. For example, the application may automatically remind an authorized user scheduled to perform routine maintenance. When an unexpected repair arises, the application may notify the authorized user (e.g., technician) daily and update the supervisor of the status of the machine weekly. The automatic notifications may differ for each user and may occur once, repeat every hour, day, week, month, or any other period (e.g., bi-weekly, bi-monthly, or annually). The user may manually input the alerts or adjust alerts automatically assigned by the application. In some embodiments, the application automatically assigns alerts.

Although the process described above includes the manual addition of keyholders, the machine location QR code may indicate which of a plurality of stored (inactive) keyholders should be automatically added as active keyholders for a digital lock placed at the machine location. For instance, the system may automatically add keyholders (e.g., Bob, Jim, Steve, Dan, Toby, and Charles) or recommend names of potential keyholders listed by name, title, responsibilities, expertise, certifications, experience, education background, specialty, and/or the like. In addition, although Bob is the operator who noticed the defect, other operators may be added as active keyholders of the digital lock to prevent further operation of the machine (e.g., Bob works first shift and operators Jim and Steve work second and third shifts respectively). In some embodiments, any keyholder may add other affected parties regardless of job title or position. As such, there may be no practical limit on the number of keyholders added at a machine location. An objective of adding these additional keyholders is to ensure the safety of all affected parties and to ensure compliance with safety regulations. In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., pin, username/password, token, biometrics, etc.) into a single user interface.

Figure 8:
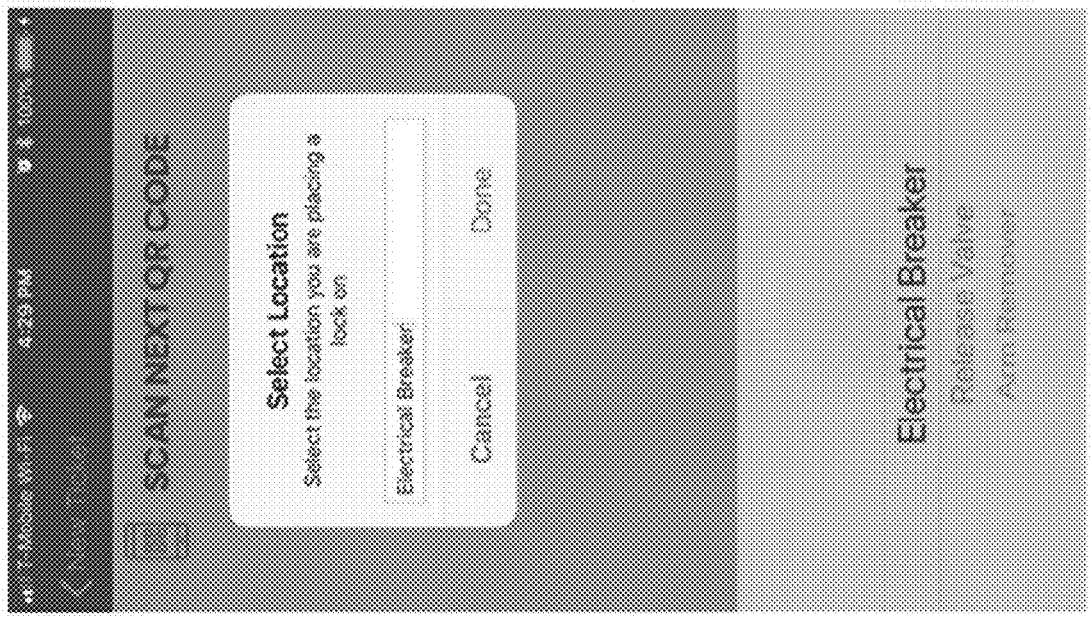
FIG. 8 illustrates a GUI of a mobile application to lock a specific machine location, according to a lockout-tagout procedure.

In FIG. 8, the user identifies the machine location of the digital lock after assigning all affected keyholders. Alternative systems may reverse the order of some of the operations described herein. For instance, the user may identify keyholders before assigning the machine location.

The electrical breaker location may require a digital lock to prevent hazardous action during operation of the machine. A system may utilize the mobile application (e.g., on an iPhone or Android device) to specify the machine location of the digital lock (e.g., the electrical breaker). Once identified, the system may provide specific, detailed instructions for steps to safely lockout the machine location. For example, the application may provide photos, videos, or text instructions to the operator (Bob) to properly shut down (i.e., lockout) an electrical breaker. The application may provide additional instructions to lockout a mechanical lever, a set of blades, a bucket, and still more instructions to lockout a pneumatic component. The system enables different locking instructions for a variety of machine locations. The single machine may require a variety of instructions, confirmations, locks, descriptions, and/or other operator actions to comply with established safety lockout procedures.

Figure 9:
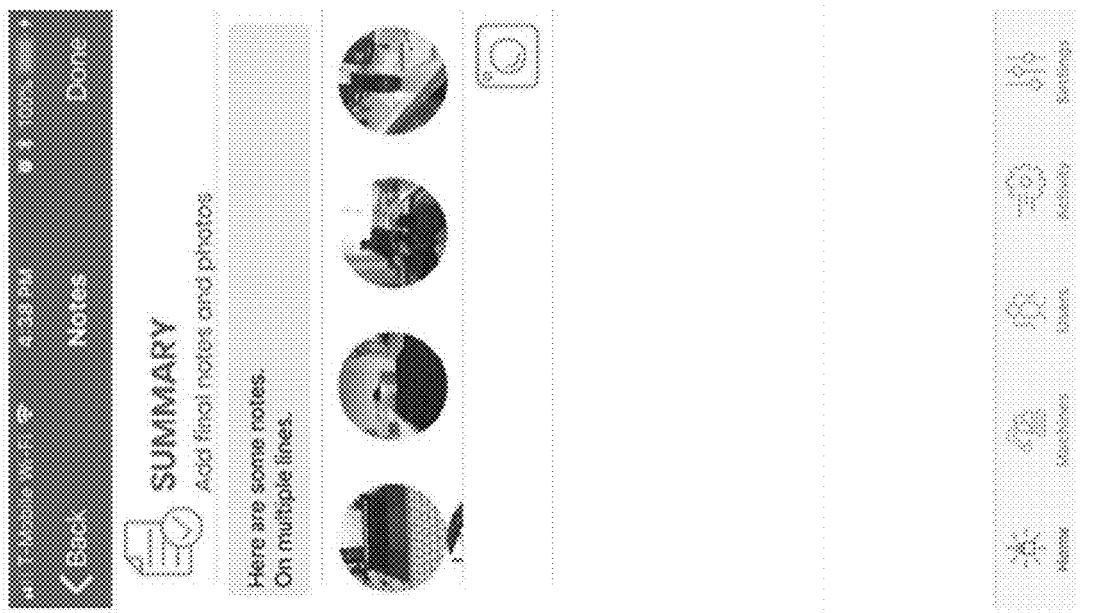
FIG. 9 illustrates a GUI of a summary of the defect and notes of any observations of the machine that may assist the authorized user.

FIG. 9 illustrates a user summary requested before or after establishing a digital lock. In various embodiments and adaptions, the system may change or reverse the order of operations. For example, the system may request a summary prior to assigning keyholders. In some embodiments, the order of operations may change based on the inputs the user selects. For example, if the user selects an electrical breaker for lockout, the system may present a first set of instructions. If the user selects a release valve for lockout instead, the system may present a second set of instructions. Thus, the selection and order of the screens in the application is variable based on user actions, the specific equipment, and/or the customization of the system by the company. The application may request (or require) a detailed summary including photos, notes of observations, attempted repairs, and/or proposed future repairs of the machine. The summary may indicate a timeline for the repairs. For example, if the machine is mission critical and urgently needed, the summary may indicate a high priority level to the authorized users. The system may request specific comments on the problem and any perceived causes or repairs in the lockout summary.

Figure 10:
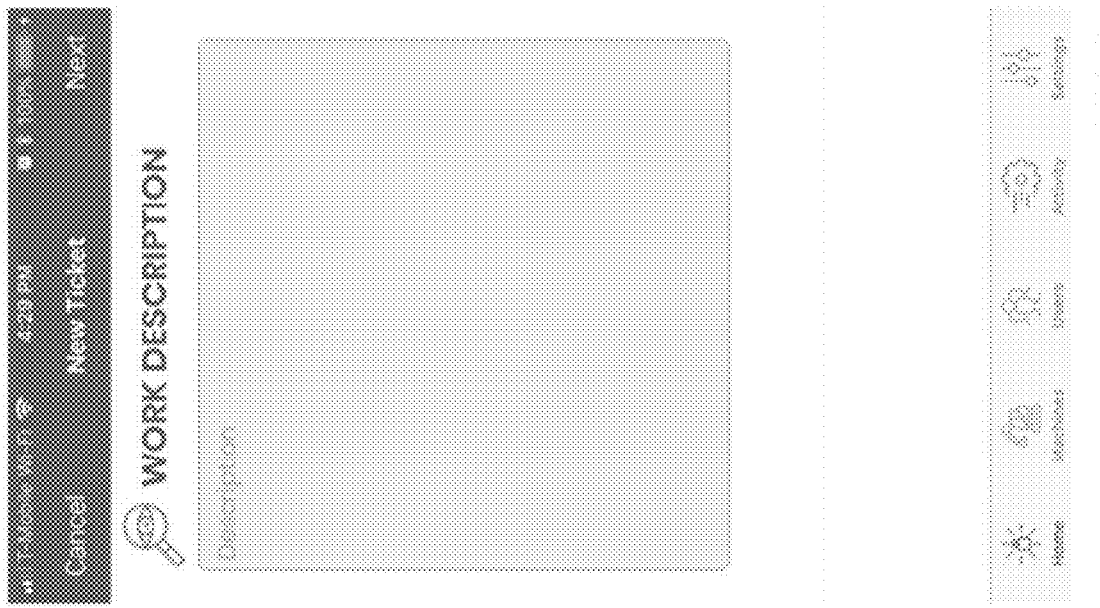
FIG. 10 illustrates a GUI of the mobile application to input repair details, photos, or a video walkthrough of the work performed.

FIG. 10 illustrates additional fields that may be optional or required for successful completion of the repair (or certification of functionality, maintenance completion, etc.). Once an authorized user (e.g., repair technician) has repaired the issue in a ticket and added any necessary or optional keyholders, the system may ask or require the authorized user to document the repair. For example, the authorized user (or authorized user in charge) may describe the work performed in a work description. In some embodiments, the authorized user cannot complete his authorization until he uploads a photo or video walk-through of the completed repair. This documentation is readily accessible for safety audits. The documentation also records the repair process for future reference. Using real-time updates of the lockout process also reduces errors, decreases the time required to restore normal operations, and seamlessly organizes safety documentation. The system may prompt or even require the authorized user to provide adequate documentation prior to allowing the authorized user to submit his digital key to unlock the machine location (e.g., remove himself as a keyholder on the digital lock).

Figure 11:
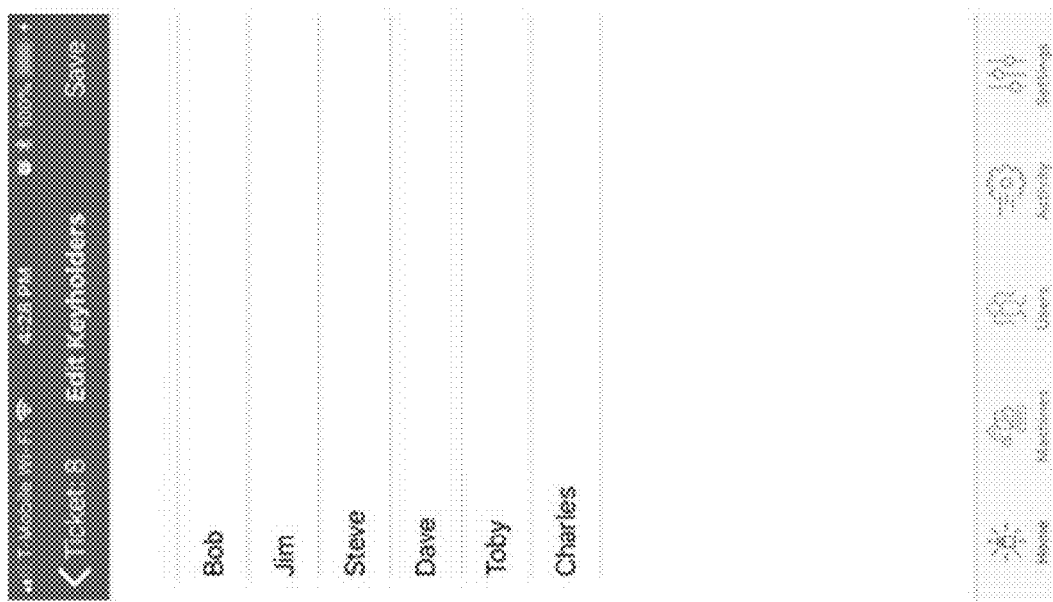
FIG. 11 illustrates a list of keyholders that are each required to unlock the digital lock before a locked machine may be used.

FIG. 11 illustrates an example "ticket 8." In this example, Bob opened the ticket as an operator of the machine. Bob noticed some mechanical defect that could be harmful and required a lockout-tagout procedure. The application required Bob to submit all necessary information to lockout the machine (e.g., as described in FIGS. 7-9). Dave and Steve are both authorized users working on repairing the machine Bob operates. In some embodiments, Steve and Dave can only unlock the digital lock on the machine upon successful completion and submission of documentation regarding the repairs (e.g., as described with reference to FIG. 10). In some embodiments, all users (e.g., Bob, Dave, Steve, etc.) may use a single electronic device (e.g., tablet, phone, wall mounted device, laptop, computer, mobile phone, etc.). In some embodiments, fast-user switching is utilized. In some embodiments, each user enters credentials (e.g., pin, username/password, token, biometrics, etc.) into a single user interface.

In some embodiments, the application may request a digital certificate of Dave and/or Steve. The system may not permit them to make repairs without the digital certificate. In some instances, the system may prevent an individual from even being added as a keyholder in the role of an "authorized user" unless he or she has the proper certification(s) to work on the machine location. For example, both Dave and Steve may be authorized to work on Caterpillar machine 745 A310 (see, e.g., "ticket 8" in FIG. 14), but Steve may only be authorized to repair the hydraulics and Dan may only be authorized to repair the electronics.

Thus, repairs at each location may require different authorized users to complete the repairs. The application may recognize a digital certificate of each authorized user (repair technician) to ascertain whether their authority to make an authorized repair. The system may, therefore, allow for role-based keyholders to be added and removed from a digital lock based on system-assigned roles, system stored roles, user confirmation of certification, user confirmation of a specific role, etc.

In some embodiments, credential utilized by the user to digitally lock the machine may be different from the credentials utilized by the user to unlock the machine. For instance, the user may utilize a pin to lock the device and a user ID card (e.g., a driver's license, passport, company-issued identification) to unlock the machine. The user ID may be scanned by an electronic tablet, phone or another device. In some embodiments, the user may be required to utilize one type of credential for locking the machine and a different type of credential for unlocking the machine. Credentials may include but are not limited to tokens, passwords, pins, chips, ID card, biometrics (e.g., fingerprints, facial recognition, retina recognition, voice authentication, etc.), one-time passwords, one-time pins, scratch-off cards, magnetic stripes, knowledge-based questions, questions based on personal information, smart cards, graphical passwords, and any combination of credentials.

Upon successful completion and documentation of the repair, the application lockout ticket may immediately notify Toby. The notification may include a text message, an email, an automated phone call, an alert, a real-time visualization via the application, and/or other communication. As the authorized user in charge, Toby may certify the completed repair. The notification process may be manual, in that Dave and Steve may request Toby's review, or the system may automatically notify Dan or Steve's supervisor. Upon inspection and authorization, the authorized user in charge may unlock the digital lock. This action may notify operator Bob (either manually or automatically). Toby or Bob may notify Jim (Bob's supervisor) of the approval by all the authorized users and operators. Bob may then unlock the machine over the network connection with his digital key. Supervisor Jim may similarly approve restoration of normal operations once he sees that Bob, and any other affected user, unlocked the machine (or machine location).

Charles may have an assigned role as of a "bolt-cutter" or otherwise have the managerial authority to digitally cut a lock when needed to ensure the restoration of normal operations. Charles may authorize the digital keys of any party in the lockout process. Bolt-cutting authority may be granted to any number of users associated with the system. In some embodiments, bolt-cutting may require two or more users with bolt-cutting authority. In some embodiments, bolt-cutting authority may require two or more users with bolt-cutting authority. Charles may authorize the digital keys of any party in the lockout process. However, on approval of all keyholders, Charles may review the process to ensure compliance with safety policies (e.g., OSHA or company policies) and unlock the machine by removing just his name as a keyholder. In such an instance, Charles need not exercise his bolt-cutting authority because everyone else has performed their duties and removed themselves as keyholders. Safety lockout procedures may authorize bolt-cutter actions when necessary, but reliance on such authority is generally the last measure. In addition, the system may notify the manager of the machine's lockout status in real time. The system may also periodically notify the manager (Charles) if the repair takes longer than planned or expected. Similarly, the system may notify Charles when a keyholder is inaccessible and/or cannot otherwise authorize unlocking the machine (i.e., cannot remove himself as a keyholder). If neither situation arises, Charles will be the last person to certify the unlocking of the machine location.

One feature of this system is that users may add keyholders to the digital lock. Each added keyholder may only authorize their own keys for removal from a digital lock (with exceptions for bolt-cutter authority and single-use codes described above). The digital lock and associated applications require each user to follow specific instructions and document the steps to unlock the assigned machine location. The system provides real-time documentation of each step in the lockout process and may be customized to conform to government regulations, company policies, industry standards, standardized best practices, or other established requirements. The ease of the electronic aspect reduces the hardware, paperwork, and coordination ordinarily required to lock and unlock the machine.

Figure 12:
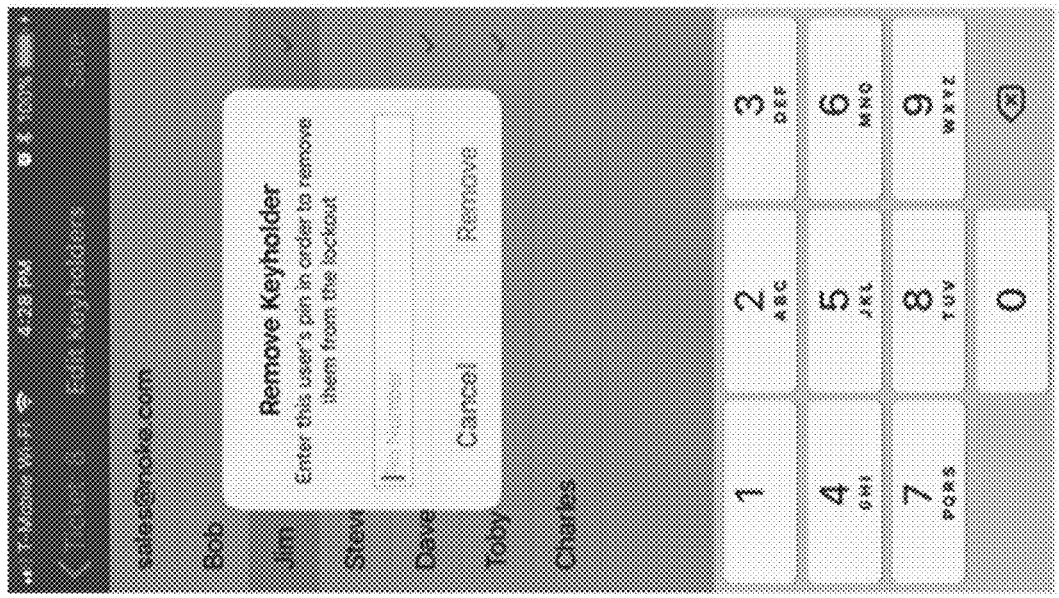
FIG. 12 illustrates an example GUI to remove a keyholder from a locked-out device using a pin.

Referring to FIG. 12, a person may not have access to the machine after an approved repair. Rather than invoking bolt-cutter authority, another user may contact the party and request a single use pin or passcode. For example, a keyholder may not have access to the application. The keyholder may not have network connectivity or may be otherwise inaccessible. For example, Jim, Bob's supervisor, is traveling out of the country and cannot connect to the local network containing the locked machine. Bob may call Jim and request him to unlock the machine. In this situation, Jim can obtain a single use pin (passcode). Jim can communicate the pin/passcode to Bob (e.g., through text, email, phone call, or other communication). Once received, Bob can unlock Jim's digital key through entry of the passcode on Jim's behalf to remove Jim's keyholder status. A single-use pin may be used in Bluetooth-only systems (or another close-proximity wireless communication system) where physical proximity may be necessary for a user to remove herself as an active keyholder. If the user is in a remote location, a single-use pin may provide a reasonable workaround that still documents the process of keyholder approval.

In some embodiments, the network may be unavailable. For example, the locked device may be located outside of a wide or local area network. Network inaccessibility may limit electronic communication between locked machines and mobile or desktop applications. For example, at the bottom of a mineshaft, heavy equipment may require a lockout-tagout procedure. Network connectivity may be unavailable. Where the lockout system is cloud-based, eventual continuity may allow periodic updates when a user does have access to the network. In some embodiments, the digital lock may be placed when offline, but the digital lock may not be unlocked when offline. Once the device associated with the digital lock establishes a connection, the digital lock made when the device associated with the lock was offline is uploaded to the server. In some embodiments, unlocking is explicitly prohibited, disabled, or available as a feature at all when the device associated with the digital lock is not connected to the server.

For example, the device associated with the digital lock at the bottom of the mineshaft may include a list of keyholders, Bob, Dan, Steve, Toby, and Charles. Although unrelated, Fred may pass proximate the locked machine an associated human interface device, and/or Bob's mobile device and information stored on Bob's application may pass to Fred's application—possibly without allowing Fred to view the information or even know that such a sharing has taken place. When Fred is in proximity to Dave or Steve, Fred's device may communicate with their devices to create a virtual network where access to a traditional network is unavailable. In addition, when Bob (or Fred) returns to the surface of the mine, the device may then connect to the cloud and update the information available to all the other affected users (e.g., Bob, Dan, Steve, Toby, and Charles). This "eventual continuity" allows the creation of a pseudo-network related to the locked device by adding passersby to the pseudo-network (e.g., Fred). In addition, eventual continuity enables delayed updates when system components are located outside the network. Eventual continuity establishes a connection and updates information upon restoration of normal network communications.

Figures 13, 14:
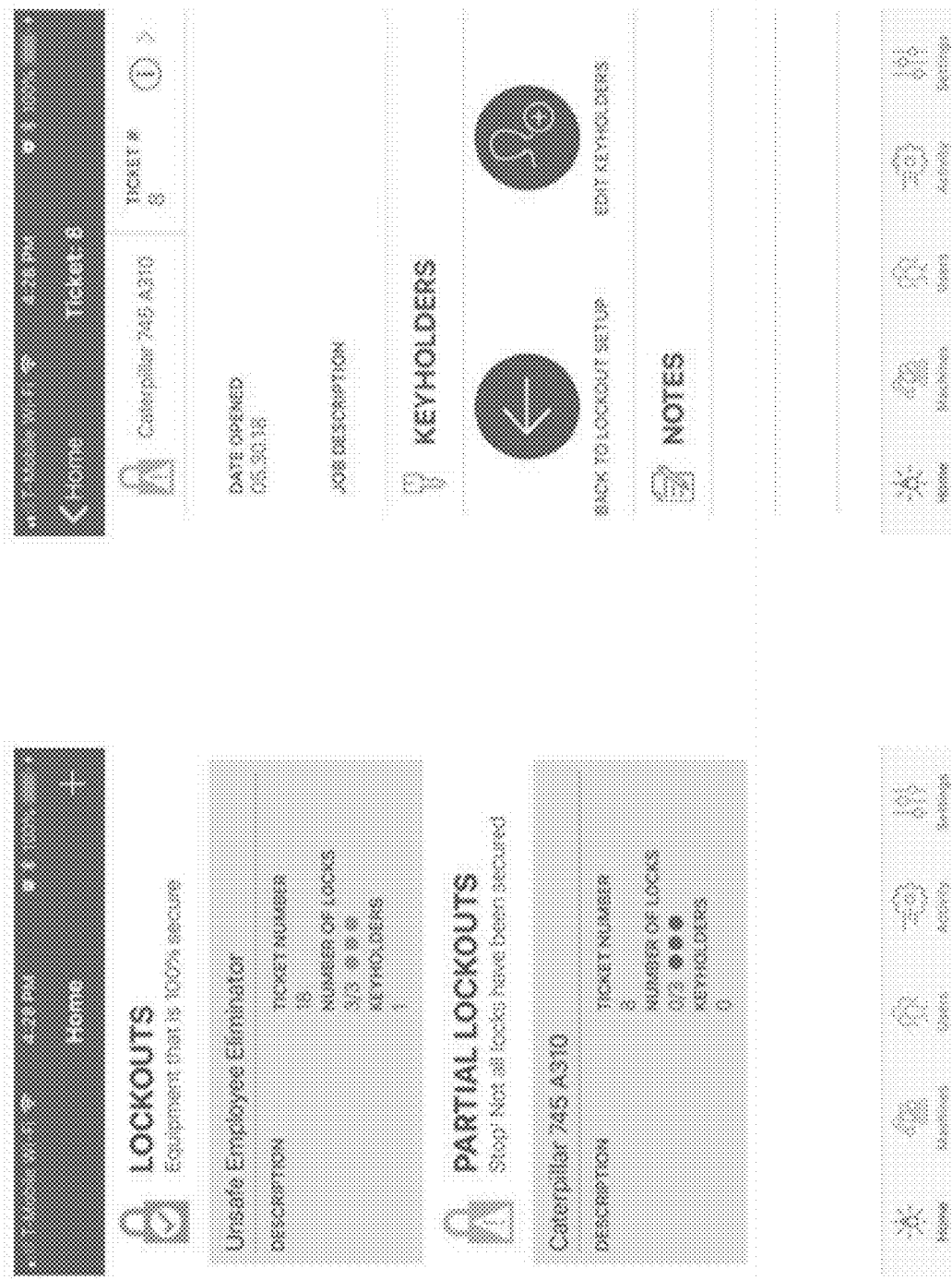
FIG. 13 illustrates an example GUI that lists completed lockouts and any partial lockouts that have not been completely secured.
FIG. 14 illustrates a keyholder home screen wherein the keyholder can review details of the lockout location and actions regarding the lockout procedure.

FIG. 13 illustrates how the application enables real-time monitoring. Managers and/or supervisors have an interest in monitoring the status and safe-operation of machines for which they are responsible. Supervisors ensure documentation of lockouts and compliance with safety requirements. To assist supervisors, the application may identify, in real-time all lockouts and/or partial lockouts. When a lockout of a machine is complete, the application displays all required documentation and lock placement confirmations (e.g., at all pertinent machine locations) in real-time. For example, FIG. 13 shows a complete lockout where the machine location has three out of three (3/3) necessary digital locks activated.

Partial lockouts indicate a problem with a machine for which the proper lockout procedures have not been completed. Partial lockouts may require the attention of a supervisor to ensure that operators, authorized users, and others implement proper safety protocols. Partial-lockouts indicate that a machine has a problem identified, but the lockout procedures are incomplete or improperly followed. For example, the home screen of a supervisor may immediately notify them of any partial lockouts and the status of repairing locked-out machinery. In this figure, zero of three (0/3) required digital locks at the machine location are complete.

In some embodiments, the entry a QR code may establish machine location for lockout. For example, a first QR code may be associated with a first lockout location of the affected machine. A second QR code may be associated with a second lockout location of the affected machine, and third, fourth, fifth, etc. QR codes may define lockout procedures for any number of affected locations.

FIG. 14 demonstrates a GUI for individual keyholders. Keyholders can make notes, query the lockout setup (e.g., locations on the machine affected by the lockout and the status of repairs), and/or add other keyholders. The system may organize information based on the machine affected (e.g., Caterpillar 745 A310) and the ticket number (or other identifying information). The ticket may identify the affected machine locations. Ticket numbers may include a photo of the machine location to assist in rapid identification of the machine and associated repair. From this view, keyholders may authorize a repair and/or digitally lock or unlock the device with their digital key. Keyholders may select required actions for machines at various locations. Keyholders may identify additional users (e.g., other parties affected by. a specific ticket number). Prior activity or tickets the keyholder has authorized are readily accessible. For example, the keyholder may remember a similar situation to the present ticket and query his past activity to see the repair process followed previously. Users can also modify device settings to customize their experience (e.g., accessibility).

Figure 15:
FIG. 15 illustrates a GUI for a login screen of a management application for a lockout-tagout application.
Figure 16:
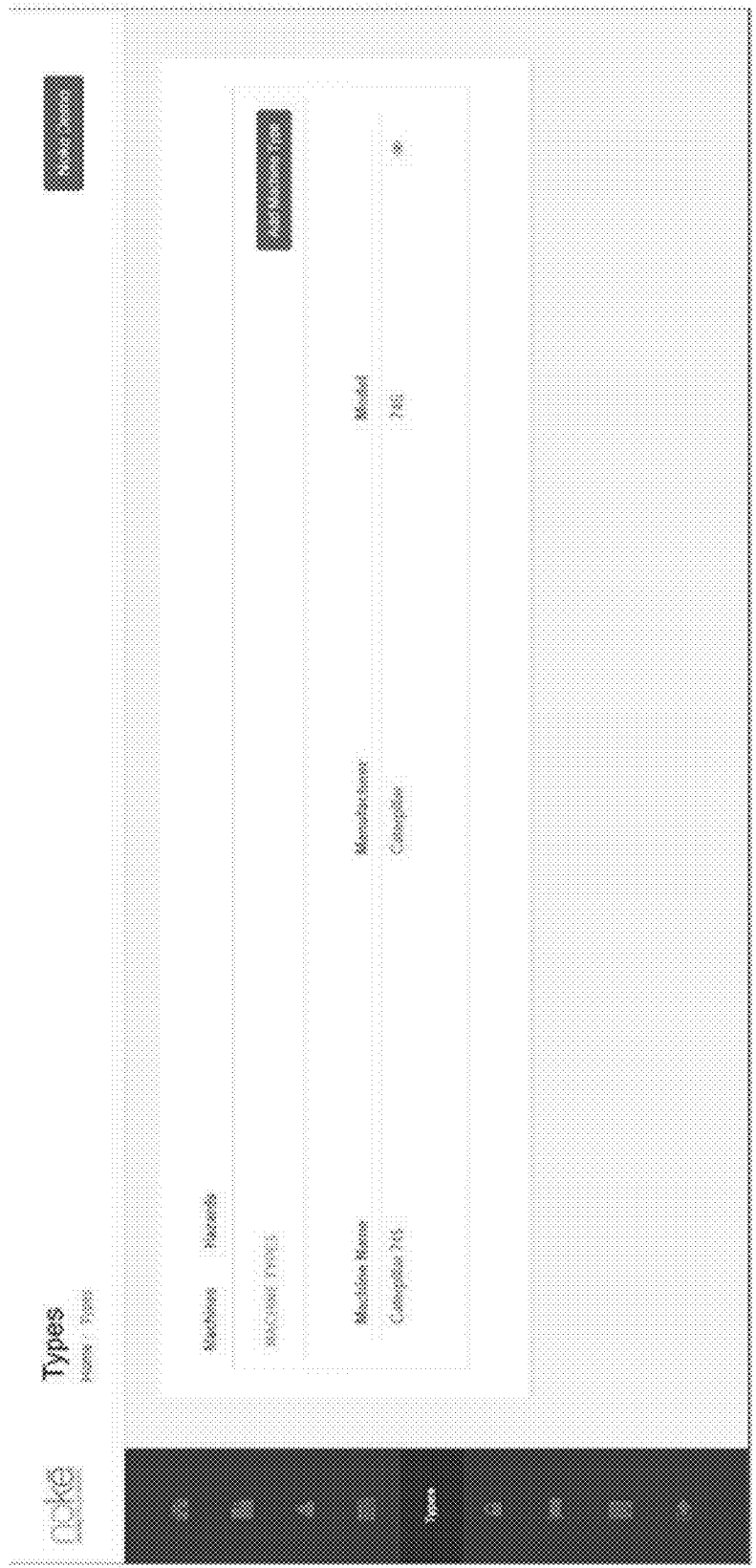
FIG. 16 illustrates a GUI for customizing or creating a lockout-tag procedure for a particular machine or device.
Figure 17:
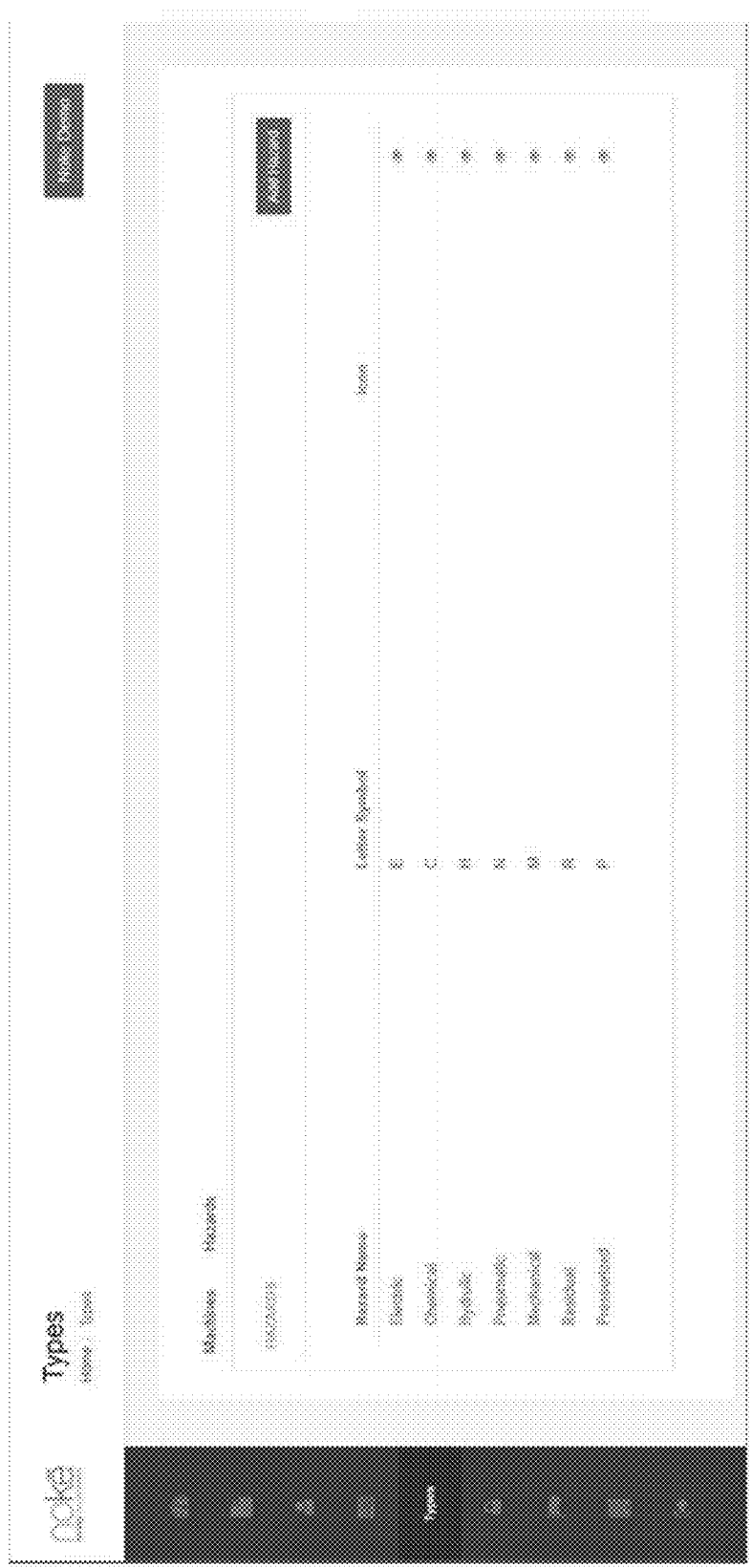
FIG. 17 illustrates a GUI for customizing or creating locations of lockouts for a specific machine type.

FIGS. 15-17 illustrate a desktop application requiring proper login credentials. In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., pin, username/password, token, biometric, etc.) into a single user interface. In some embodiments, authorization of a login attempt includes a real-time confirmation that the user (e.g., the technician) is certified to repair, maintain or otherwise alter the device. In some embodiments, login includes comparing the user credentials to a credentials database. In some embodiments, the credentials database may be owned and maintained by a third party. In some embodiments, the credentials database may be maintained by the operator of the lock system and the lock system may be provided to the user as a SaaS model. In some embodiments, the credentials database may be maintained by an owner of the devices utilizing the locking system (i.e., the machines being locked out).

In some embodiments, the credentials database may maintain user certification to ensure the user is authorized. In some embodiments, the credentials database may require technicians to provide or update certifications on a periodic basis. If the user is not authenticated, the user is not authorized to lockout the machine and/or the machine and/or device associated with the machine may send a notification to the user's supervisor. If the user is authenticated, the user may lockout the machine and start working. In some embodiments, a notification may be sent to the user's supervisor and/or other related parties informing the supervisor and/or another party that the user started working on the device.

In some embodiments, credential utilized by the user to digitally lock the device may be different from the credentials utilized by the user to unlock the device. For instance, the user may utilize a pin to lock the device and a user ID card (e.g., a driver's license, passport, company-issued identification) to unlock the device. The user ID may be scanned by an electronic tablet, phone or another device. In some embodiments, the user may be required to utilize one type of credential for locking the device and a different type of credential for unlocking the device. Credentials may include but are not limited to tokens, passwords, pins, chips, ID card, biometrics (e.g., fingerprints, facial recognition, retina recognition, voice authentication, etc.), one-time passwords, one-time pins, scratch-off cards, magnetic stripes, knowledge-based questions, questions based on personal information, smart cards, graphical passwords, and any combination of credentials.

Upon login, the keyholder can select machines types, add new machines, add new keyholders, add roles to keyholders, customize lockout procedures, etc. The query may search a machine type based on the model number, identification number, serial number, model number, manufacturer, name, or other selectable attributes. The machine type may display all the machines lockout locations. For example, referring to FIG. 17, a specific machine type may be associated with one or more hazard types. The system may allow an operator to use an interface, such as the example interface in FIG. 17, to add different hazard types applicable to the particular job site or industry.

Any system may have a customized lockout procedure. A lockout procedure for a particular machine or equipment may require multiple digital locks. For example, a harvester may require a digital lock on the breaks and a digital lock on the blades. A locked machine and/or lockout device may directly communicate with cloud-based applications and databases, or the locked machine and/or lockout device may communicate with cloud-based applications and/or other users via close-proximity wireless networks.

Figure 18:
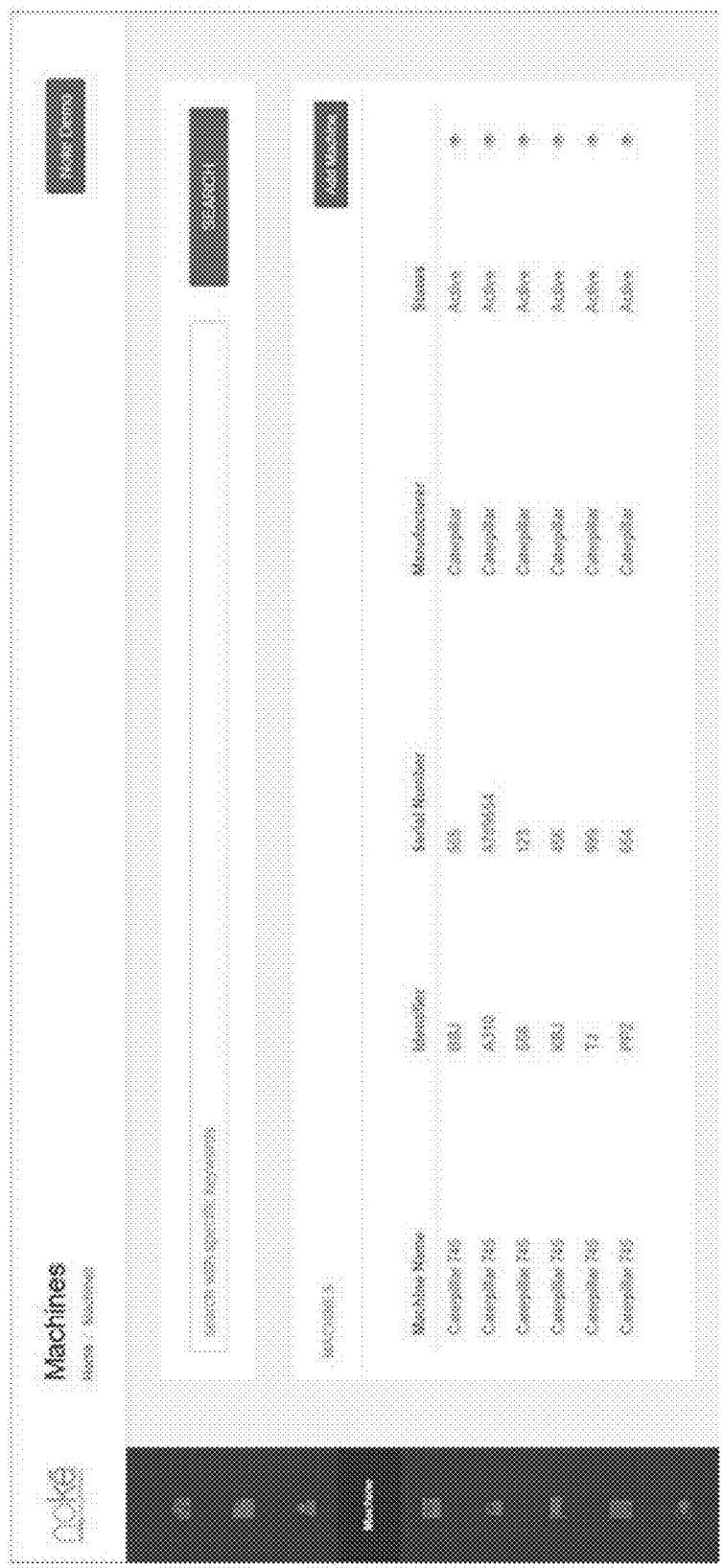
FIG. 18 illustrates a GUI for customizing or creating a list of machines (e.g., on a factory floor or a job site) that displays an active or lockout status.
Figure 19:
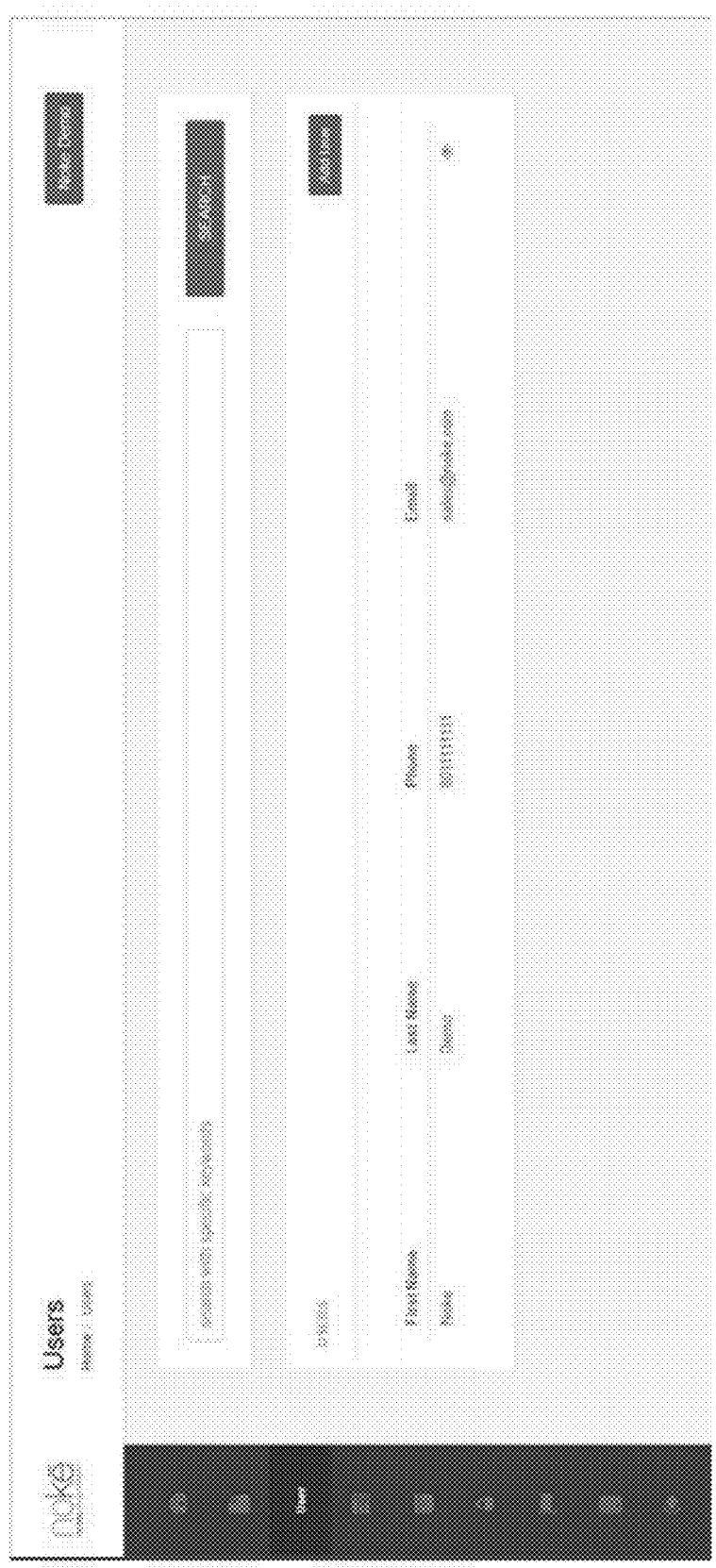
FIG. 19 illustrates a GUI for customizing or creating a list of keyholders for a lockout device.

FIG. 18 illustrates the desktop applications' ability to query, customize, and/or edit machines to view attributes and lockout locations of the machine. For example, a series of machines of the same, or similar, type with may have different identifiers, serial numbers, or other identifying features. The desktop application may also indicate whether the specific machine is active or inactive. FIG. 19 illustrates how the desktop application may also indicate any potential users, operators, authorized users, authorized users in charge, supervisors, managers, or other affected personnel (e.g., keyholders).

Figure 20:
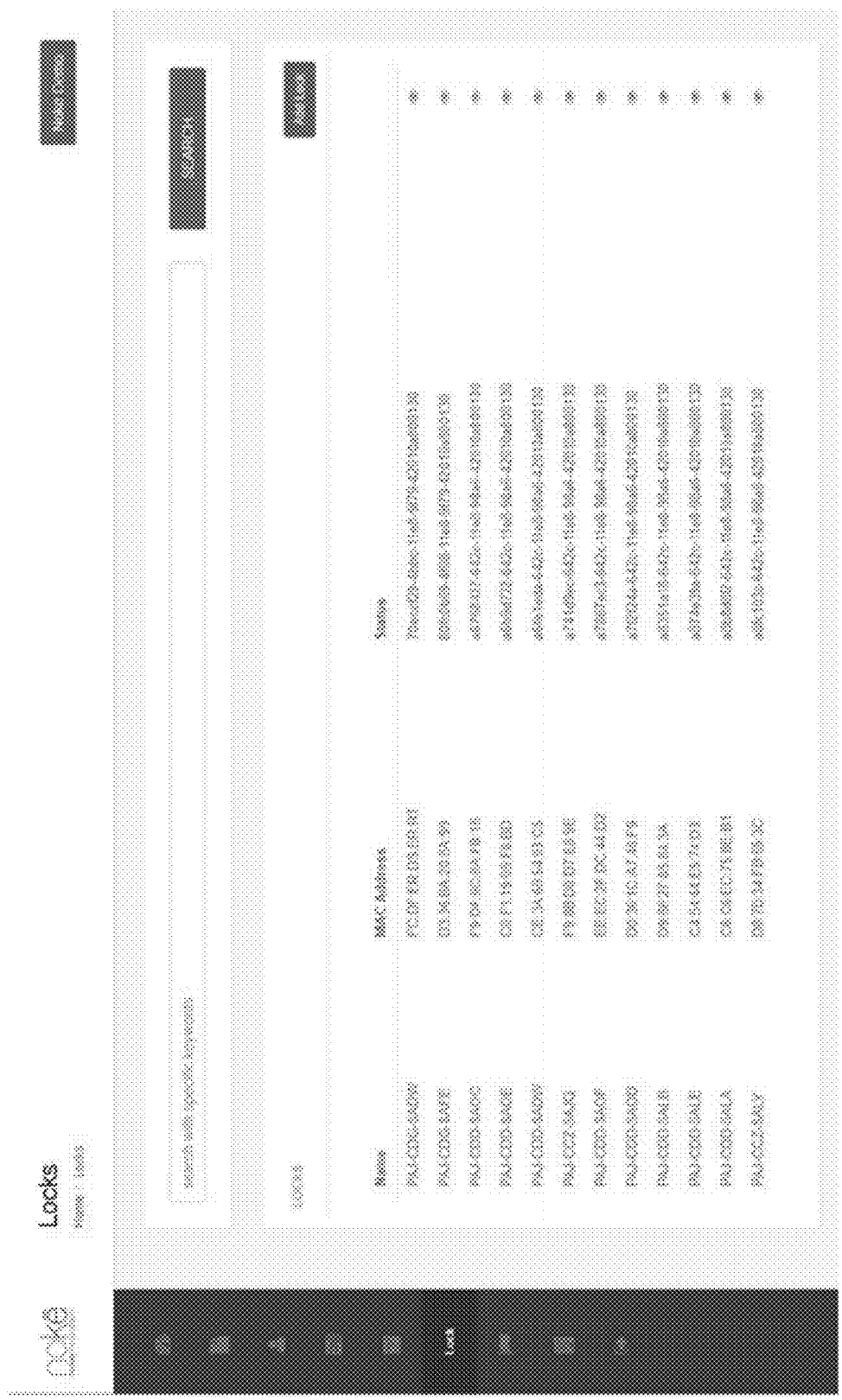
FIG. 20 illustrates a GUI customizing or creating a list of network-enabled digital locks in a system.

FIG. 20 illustrates the desktop application of the system that permits queries on specific digital locks of the network. The system may display the status (e.g., locked or unlocked) of the digital locks. In addition, the system enables searching by each digital lock's name, MAC address of the device associated with the digital lock, status, or other identifying features. The user may also view the results of the search, which provides additional details of each individual digital lock.

FIG. 21 illustrates a portion of an interface 2100 of a software program for actuating, controlling, and configuring a wireless-enabled digital lock. A user may select a lock symbol or an unlock symbol associated with a machine. The user may then enter user credentials. In some embodiments, the credentials utilized by the user to digitally lock the machine may be different from the credentials utilized by the user to unlock the machine. For instance, the user may utilize a pin to lock the machine digitally and a user ID card (e.g., a driver's license, passport, company-issued identification) to unlock the machine. The user ID may be scanned by an electronic tablet, phone or another machine. In some embodiments, the user may be required to utilize one type of credential for locking the machine and a different type of credential for unlocking the machine. Credentials may include but are not limited to tokens, passwords, pins, chips, ID card, biometrics (e.g., fingerprints, facial recognition, retina recognition, voice authentication, etc.), one-time passwords, one-time pins, scratch-off cards, magnetic stripes, knowledge-based questions, personal based questions, smart cards, graphical passwords, and any combination of credentials.

In some embodiments, each digital lock is uniquely represented in the user interface and individually lockable and unlockable. In other embodiments, each machine that is or can be locked-out is listed and represents all the digital locks associated therewith. For example, selecting the lock or unlock icon for the molding machine may unlock or lock all of the digital locks associated with the molding machine. The digital locks may be general (unassociated) digital locks until they are digitally locked, at which point the user must associate them with a particular machine and/or they are automatically associated with a machine based on location and/or the access point utilized for authorization or to send lock status updates. In such embodiments, the lock and unlock icons may affect the digital locks associated with the machine until such digital locks are de-associated from the particular machine.

In some embodiments, all users may use a single electronic device (e.g., tablet, phone, wall mounted device, laptop, computer, mobile phone, etc.). In some embodiments, fast-user switching is utilized. In some embodiments, each user enters credentials (e.g., pin, username/password, token, biometrics, etc.) into a single user interface. In some embodiments, a user interface of the application may allow a mobile device to be paired with the digital lock for faster access in the future. In some embodiments, the digital lock may be locked when the device associated with the digital locks is offline but only allow unlocking when the device associated with the digital lock is online. Once the device associated with the digital lock establishes a connection, the digital lock established while the device associated with the digital lock was offline is uploaded to the server. In some embodiments, unlocking the digital lock is prohibited when the device associated with the digital lock is not connected to the server. In some embodiments, authentication of unlock attempts made by users are exclusively allowed through servers. In some embodiments, each interaction with the device associated with the digital lock is recorded.

In some embodiments, a digital lock may be selectively disabled for the entire system. In some embodiments, offline functionality may be selectively disabled when the device associated with the digital lock is utilized in conjunction with devices having higher danger levels and enabled when utilized in conjunction with devices of lower danger levels.

In some embodiments, authentication may include real-time confirmation the user (e.g., the technician) is certified to repair, maintain or otherwise alter the device. In some embodiments, authentication includes comparing the user credentials to a credentials database. In some embodiments, the credentials database may be owned and maintained by a third party. In some embodiments, the credentials database may be maintained by the operator of the lock system and the lock system may be provided to the user as a SaaS model. In some embodiments, the credentials database may be maintained by an owner of the machines utilizing the locking system (i.e., the machines being locked out). In some embodiments, the credentials database may maintain user certification to ensure the user is authorized. In some embodiments, the credentials database may require technicians to provide or update certifications on a periodic basis. If the user is not authenticated, the user is not authorized to lockout the machine and/or the machine may send a notification to the user's supervisor. If the user is authenticated, the user may lockout the machine and start working. In some embodiments, a notification may be sent to the user's supervisor and/or other related parties informing the supervisor and/or another party that the user started working on the device.

This disclosure has references various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

What is claimed is:

1. A computer-implemented method for actuating, controlling, and configuring a multi-user digital locking device for preventing operation of a machine, the method comprising:
   receiving, from a first of a plurality of mobile devices and by the digital locking device, first input enabling a locking operation on the machine by the first of the plurality of mobile devices, wherein the first input specifies at least a second of the plurality of mobile devices, each of the plurality of mobile devices having access to a digital key for enabling an unlocking operation, the digital key of each of the plurality of mobile devices being distinct from one another;
   performing, by the digital locking device, the locking operation to prevent the operation of the machine;
   receiving, by the digital locking device, second input from the first mobile device and third input from the second mobile device enabling an unlocking operation to disable the prevention;
   confirming, by the digital locking device, whether to perform the unlocking operation based on the received second input and third input; and
   performing, by the digital locking device and in response to the confirmation, the unlocking operation on the machine.

2. The computer-implemented method of claim 1, wherein the second input comprises the digital key of the first mobile device and the third input comprises the digital key of the second mobile device.

3. The computer-implemented method of claim 2, wherein confirming whether to perform the unlocking operation comprises confirming that the digital keys of the first and second mobile devices are authorized.

4. The computer-implemented method of claim 3, further comprising, in response to determining that the digital key of the second mobile device is unauthorized, returning an error.

5. The computer-implemented method of claim 1, wherein at least one of the second and third inputs is a physical input pattern.

6. The computer-implemented method of claim 5, wherein confirming whether to perform the unlocking operation comprises confirming that the physical input pattern matches a stored pattern.

7. The computer-implemented method of claim 1, further comprising maintaining, by the locking device, a logged history of a plurality of events associated with unlocking and unlocking operations associated with the machine.

8. A multi-user digital locking device, comprising:
   a processor; and,
   a memory storing program code, which, when executed on the processor, performs an operation for actuating, controlling, and configuring the multi-user digital locking device for preventing a machine from operating, the operation comprising:
      receiving, from a first of a plurality of mobile devices and by the digital locking device, first input enabling a locking operation on the machine by the first of the plurality of mobile devices, wherein the first input specifies at least a second of the plurality of mobile devices, each of the plurality of mobile devices having access to a digital key for enabling an unlocking operation, the digital key of each of the plurality of mobile devices being distinct from one another;
      performing, by the digital locking device, the locking operation to prevent the machine from operating;
      receiving, by the digital locking device, second input from the first mobile device and third input from the second mobile device enabling an unlocking operation to disable the prevention;
      confirming, by the digital locking device, whether to perform the unlocking operation based on the received second input and third input; and
      performing, by the digital locking device and in response to the confirmation, the unlocking operation on the machine.

9. The multi-user digital locking device of claim 8, wherein the second input comprises the digital key of the first mobile device and the third input comprises the digital key of the second mobile device.

10. The multi-user digital locking device of claim 9, wherein confirming whether to perform the unlocking operation comprises confirming that the digital keys of the first and second mobile devices are authorized.

11. The multi-user digital locking device of claim 10, wherein the operation further comprises, in response to determining that the digital key of the second mobile device is unauthorized, returning an error.

12. The multi-user digital locking device of claim 8, wherein at least one of the second and third inputs is a physical input pattern.

13. The multi-user digital locking device of claim 12, wherein confirming whether to perform the unlocking operation comprises confirming that the physical input pattern matches a stored pattern.

14. The multi-user digital locking device of claim 8, wherein the operation further comprises maintaining, by the locking device, a logged history of a plurality of events associated with unlocking and unlocking operations associated with the machine.

15. A non-transitory computer-readable storage medium storing instructions, which, when executed on a processor, perform an operation for actuating, controlling, and configuring a multi-user digital locking device for preventing a machine from operating, the operation comprising:
   receiving, from a first of a plurality of mobile devices and by the digital locking device, first input enabling a locking operation on the machine by the first of the plurality of mobile devices, wherein the first input specifies at least a second of the plurality of mobile devices, each of the plurality of mobile devices having access to a digital key for enabling an unlocking operation, the digital key of each of the plurality of mobile devices being distinct from one another;
   performing, by the digital locking device, the locking operation to prevent the machine from operating;
   receiving, by the digital locking device, second input from the first mobile device and third input from the second mobile device enabling an unlocking operation to disable the prevention;
   confirming, by the digital locking device, whether to perform the unlocking operation based on the received second input and third input; and
   performing, by the digital locking device and in response to the confirmation, the unlocking operation on the machine.

16. The non-transitory computer-readable storage medium of claim 15, wherein the second input comprises the digital key of the first mobile device and the third input comprises the digital key of the second mobile device.

17. The non-transitory computer-readable storage medium of claim 16, wherein confirming whether to perform the unlocking operation comprises confirming that the digital keys of the first and second mobile devices are authorized.

18. The non-transitory computer-readable storage medium of claim 17, wherein the operation further comprises, in response to determining that the digital key of the second mobile device is unauthorized, returning an error.

19. The non-transitory computer-readable storage medium of claim 15, wherein at least one of the second and third inputs is a physical input pattern, and wherein confirming whether to perform the unlocking operation comprises confirming that the physical input pattern matches a stored pattern.

20. The non-transitory computer-readable storage medium of claim 15, wherein the operation further comprises maintaining, by the locking device, a logged history of a plurality of events associated with unlocking and unlocking operations associated with the machine.

\* \* \* \* \*